United States Patent
Hsu et al.

(10) Patent No.: US 11,143,845 B2
(45) Date of Patent: Oct. 12, 2021

(54) OPTICAL IMAGING LENS ASSEMBLY, IMAGE CAPTURING UNIT AND ELECTRONIC DEVICE

(71) Applicant: LARGAN PRECISION CO.,LTD., Taichung (TW)

(72) Inventors: Po-Lun Hsu, Taichung (TW); Tzu-Chieh Kuo, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 176 days.

(21) Appl. No.: 16/404,508

(22) Filed: May 6, 2019

(65) Prior Publication Data

US 2020/0301110 A1   Sep. 24, 2020

(30) Foreign Application Priority Data

Mar. 20, 2019   (TW) ................. 108109547

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC ...... G02B 13/0045; G02B 9/64; G02B 13/06; G02B 9/00–64; G02B 13/002–0045; G02B 13/18; G02B 3/04
USPC ................................ 359/708–718
See application file for complete search history.

(56) References Cited

U.S. PATENT DOCUMENTS

| 4,963,007 | A | 10/1990 | Moskovich |
| 5,087,989 | A | 2/1992 | Igarashi |
| 10,139,598 | B1 | 11/2018 | Wang et al. |
| 2015/0378131 | A1 | 12/2015 | Tang et al. |
| 2016/0131874 | A1 | 5/2016 | Tang et al. |
| 2016/0241756 | A1* | 8/2016 | Chen .................. G02B 13/0045 |
| 2016/0299319 | A1 | 10/2016 | Tang et al. |
| 2017/0045714 | A1* | 2/2017 | Huang ............... G02B 13/0045 |
| 2017/0052350 | A1* | 2/2017 | Chen .................. G02B 13/0045 |

(Continued)

FOREIGN PATENT DOCUMENTS

| CN | 107422465 A | 12/2017 |
| CN | 107621681 A | 1/2018 |

(Continued)

OTHER PUBLICATIONS

Indian Office Action issued in corresponding application No. 201934020983, dated Mar. 24, 2021.

*Primary Examiner* — Marin Pichler
*Assistant Examiner* — Alberto J Betancourt
(74) *Attorney, Agent, or Firm* — Maschoff Brennan

(57) ABSTRACT

An optical imaging lens assembly includes seven lens elements which are, in order from an object side to an image side: a first lens element, a second lens element, a third lens element, a fourth lens element, a fifth lens element, a sixth lens element and a seventh lens element. Each of the seven lens elements of the optical imaging lens assembly has an object-side surface facing toward the object side and an image-side surface facing toward the image side. At least one lens element of the optical imaging lens assembly has at least one aspheric lens surface having at least one inflection point. The object-side surface of the seventh lens element is concave in a paraxial region thereof.

13 Claims, 21 Drawing Sheets

(56) References Cited

U.S. PATENT DOCUMENTS

| | | |
|---|---|---|
| 2017/0059825 A1 | 3/2017 | Tang et al. |
| 2017/0059826 A1 | 3/2017 | Tang et al. |
| 2017/0168267 A1 | 6/2017 | Tang et al. |
| 2017/0168268 A1 | 6/2017 | Tang et al. |
| 2017/0329106 A1 | 11/2017 | Lai et al. |
| 2017/0329107 A1 | 11/2017 | Lai et al. |
| 2017/0336605 A1 | 11/2017 | Lai et al. |
| 2017/0336606 A1 | 11/2017 | Lai et al. |
| 2018/0011296 A1 | 1/2018 | Lai et al. |
| 2018/0011297 A1 | 1/2018 | Lai et al. |
| 2018/0074299 A1 | 3/2018 | Huang |
| 2018/0188493 A1 | 7/2018 | Huang |
| 2018/0196225 A1 | 7/2018 | Chang et al. |
| 2018/0196233 A1 | 7/2018 | Chang et al. |
| 2018/0196234 A1 | 7/2018 | Chang et al. |
| 2018/0196239 A1 | 7/2018 | Chang et al. |
| 2018/0335608 A1 | 11/2018 | Chang et al. |
| 2018/0335609 A1 | 11/2018 | Chang et al. |
| 2019/0025558 A1 | 1/2019 | Chen et al. |
| 2019/0041609 A1* | 2/2019 | Chang ............... G02B 13/0045 |
| 2019/0121088 A1 | 4/2019 | Shi et al. |
| 2019/0187414 A1 | 6/2019 | Zhang |
| 2020/0271897 A1 | 8/2020 | Huh et al. |
| 2020/0333568 A1 | 10/2020 | Nakamura |

FOREIGN PATENT DOCUMENTS

| | | |
|---|---|---|
| CN | 107957619 A | 4/2018 |
| CN | 108121054 A | 6/2018 |
| CN | 207473173 U | 6/2018 |
| CN | 109031628 A | 12/2018 |
| CN | 109254385 A | 1/2019 |
| CN | 109358416 A | 2/2019 |
| CN | 109407277 A | 3/2019 |
| CN | 109491047 A | 3/2019 |
| CN | 109613684 A | 4/2019 |
| IN | 201734045049 A | 1/2019 |
| JP | H01-197718 A | 8/1989 |
| TW | I646368 B | 1/2019 |
| TW | I650577 B | 2/2019 |
| TW | I650589 B | 2/2019 |
| TW | I650590 B | 2/2019 |
| TW | I651565 B | 2/2019 |
| WO | 2016109938 A1 | 7/2016 |
| WO | 2020/134140 A | 7/2020 |

* cited by examiner

OPTICAL IMAGING LENS ASSEMBLY, IMAGE CAPTURING UNIT AND ELECTRONIC DEVICE

RELATED APPLICATIONS

This application claims priority to Taiwan Application 108109547, filed on Mar. 20, 2019, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens assembly includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

At least one lens element of the optical imaging lens assembly has at least one aspheric lens surface having at least one inflection point. The object-side surface of the seventh lens element is concave in a paraxial region thereof.

When an Abbe number of the sixth lens element is V6, a curvature radius of the object-side surface of the seventh lens element is R13, a curvature radius of the image-side surface of the seventh lens element is R14, a focal length of the optical imaging lens assembly is f, a focal length of the fourth lens element is f4, a focal length of the fifth lens element is f5, a focal length of the sixth lens element is f6, a central thickness of the fifth lens element is CT5, a central thickness of the sixth lens element is CT6, an axial distance between the object-side surface of the first lens element and an image surface is TL, and a maximum image height of the optical imaging lens assembly is ImgH, the following conditions are satisfied:

$12.0 < V6 < 34.0;$ $1.60 < |R14/R13|;$ $|f/f4| + |f/f5| + |f/f6| < 1.35;$ $0.10 < CT5/CT6 < 0.75;$ and $0.80 < TL/ImgH < 1.70.$ According to another aspect of the present disclosure, an optical imaging lens assembly includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

At least one lens element of the optical imaging lens assembly has at least one aspheric lens surface having at least one inflection point. The object-side surface of the seventh lens element is concave in a paraxial region thereof.

When an Abbe number of the sixth lens element is V6, a curvature radius of the object-side surface of the seventh lens element is R13, a curvature radius of the image-side surface of the seventh lens element is R14, a focal length of the optical imaging lens assembly is f, a focal length of the first lens element is f1, a focal length of the fourth lens element is f4, a focal length of the fifth lens element is f5, a focal length of the sixth lens element is f6, a central thickness of the fifth lens element is CT5, and an axial distance between the fifth lens element and the sixth lens element is T56, the following conditions are satisfied:

$10.0 < V6 < 50.0;$ $1.60 < |R14/R13|;$ $|f/f4| + |f/f5| + |f/f6| < 1.20;$ $0.10 < CT5/T56 < 1.25;$ and $|f/f1| < 1.80.$ According to another aspect of the present disclosure, an optical imaging lens assembly includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

At least one lens element of the optical imaging lens assembly has at least one aspheric lens surface having at least one inflection point. The object-side surface of the seventh lens element is concave in a paraxial region thereof.

When an Abbe number of the sixth lens element is V6, a curvature radius of the object-side surface of the fourth lens element is R7, a curvature radius of the object-side surface of the seventh lens element is R13, a curvature radius of the image-side surface of the seventh lens element is R14, a focal length of the optical imaging lens assembly is f, a focal length of the fourth lens element is f4, a focal length of the fifth lens element is f5, a focal length of the sixth lens element is f6, and an axial distance between the object-side surface of the first lens element and the image-side surface of the seventh lens element is TD, the following conditions are satisfied:

$12.0 < V6 < 34.0;$ $2.20 < |R14/R13|;$ $|f/f4|+|f/f5|+|f/f6|<1.20$; and $2.80<|R7|/TD$.

According to another aspect of the present disclosure, an image capturing unit includes the aforementioned optical imaging lens assembly and an image sensor, wherein the image sensor is disposed on an image surface of the optical imaging lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens assembly includes seven lens elements. The seven lens elements are, in order from an object side to an image side, a first lens element, a second lens element, a third lens element, a fourth lens element, a fifth lens element, a sixth lens element and a seventh lens element. Each of the seven lens elements of the optical imaging lens assembly has an object-side surface facing toward the object side and an image-side surface facing toward the image side.

The first lens element can have positive refractive power. Therefore, it is favorable for providing the positive refractive power required for reducing the size of the optical imaging lens assembly. The object-side surface of the first lens element can be convex in a paraxial region thereof. Therefore, it is favorable for light rays at different regions within the field of view to travel into the optical imaging lens assembly evenly. The image-side surface of the first lens element can be concave in a paraxial region thereof. Therefore, it is favorable for correcting astigmatism.

The second lens element can have negative refractive power. Therefore, it is favorable for correcting aberrations generated due to the miniaturization of the optical imaging lens assembly. The image-side surface of the second lens element can be concave in a paraxial region thereof. Therefore, it is favorable for adjusting the refractive power of the second lens element.

The third lens element can have positive refractive power. Therefore, it is favorable for balancing the positive refractive power distribution of the optical imaging lens assembly so as to reduce aberrations generated by a single lens element. The object-side surface of the third lens element can be convex in a paraxial region thereof. Therefore, it is favorable for the second and third lens elements to collaborate with each other so as to correct aberrations.

The object-side surface of the seventh lens element is concave in a paraxial region thereof. Therefore, it is favorable for having a proper incident angle of light rays on the seventh lens element so as to improve peripheral image quality on the image surface, thereby obtaining a wide angle configuration. The seventh lens element can have negative refractive power. Therefore, it is favorable for the optical imaging lens assembly to have a proper back focal length.

Figure 21:
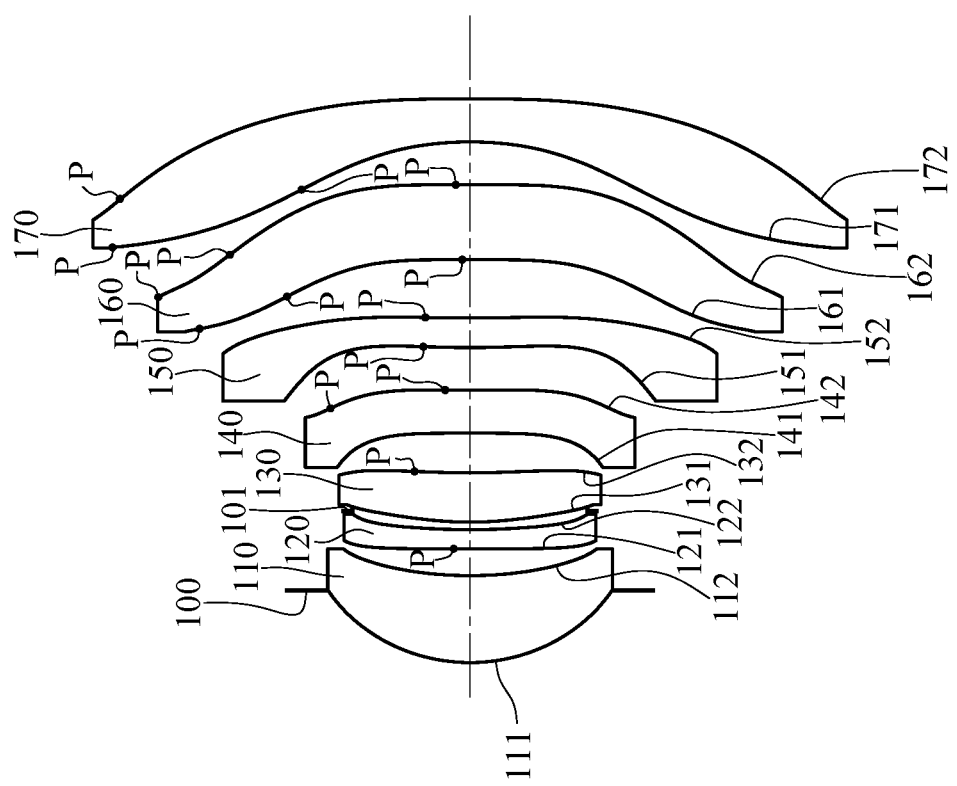
FIG. 21 shows a schematic view of inflection points of some of the first through seventh lens elements according to the 1st embodiment of the present disclosure.

According to the present disclosure, at least one lens element of the optical imaging lens assembly has at least one aspheric lens surface having at least one inflection point. Therefore, it is favorable for increasing the shape variation of the lens elements so as to reduce the size of the optical imaging lens assembly and improve image quality. Moreover, each of at least two lens elements of the optical imaging lens assembly can have at least one aspheric lens surface having at least one inflection point. Moreover, each of at least three lens elements of the optical imaging lens assembly can have at least one aspheric lens surface having at least one inflection point. Moreover, at least one of the object-side surface and the image-side surface of the sixth lens element can be aspheric and have at least one inflection point. Therefore, it is favorable for increasing the shape variation of the sixth lens element so as to improve peripheral image quality. Moreover, at least one of the object-side surface and the image-side surface of the seventh lens element can be aspheric and have at least one inflection point. Therefore, it is favorable for increasing the shape variation of the seventh lens element so as to improve peripheral image quality, and adjusting the size distribution of the optical imaging lens assembly. Please refer to FIG. 21, which shows a schematic view of inflection points P of the second lens element 120, the third lens element 130, the fourth lens element 140, the fifth lens element 150, the sixth lens element 160 and the seventh lens element 170 according to the 1st embodiment of the present disclosure.

According to the present disclosure, as to at least one lens element of the optical imaging lens assembly, the object-side surface and the image-side surface can be both aspheric, and each of the object-side surface and the image-side surface can have at least one inflection point. Therefore, it is favorable for further increasing the shape variation of the lens elements so as to correct off-axis aberrations. Moreover, as to each of at least two lens elements of the optical imaging lens assembly, the object-side surface and the image-side surface can be both aspheric, and each of the object-side surface and the image-side surface can have at least one inflection point. Moreover, the object-side surface and the image-side surface of the sixth lens element can be both aspheric, and each of the object-side surface and the image-side surface of the sixth lens element can have at least one inflection point. Therefore, it is favorable for further increasing the shape variation of the sixth lens element so as to correct aberrations such as off-axis field curvature and increase peripheral illuminance on the image surface.

When an Abbe number of the sixth lens element is V6, the following condition is satisfied: $10.0<V6<50.0$. Therefore, it is favorable for adjusting the material of the sixth lens element so as to correct chromatic aberration for reducing colour cast. Moreover, the following condition can also be satisfied: $11.0<V6<42.0$. Moreover, the following condition can also be satisfied: $12.0<V6<34.0$. Moreover, the following condition can also be satisfied: $13.0<V6<30.0$. Moreover, the following condition can also be satisfied: $14.0<V6<25.0$.

When a curvature radius of the object-side surface of the seventh lens element is R13, and a curvature radius of the image-side surface of the seventh lens element is R14, the following condition is satisfied: $1.60<|R14/R13|$. Therefore, it is favorable for adjusting the lens shape of the seventh lens element so as to correct off-axis aberrations and increase peripheral illuminance on the image surface, thereby obtaining a wide angel configuration. Moreover, the following condition can also be satisfied: $2.20<|R14/R13|$. Moreover, the following condition can also be satisfied: $5.00<|R14/R13|$. Moreover, the following condition can also be satisfied: $10.0<|R14/R13|$.

When a focal length of the optical imaging lens assembly is f, a focal length of the fourth lens element is f4, a focal length of the fifth lens element is f5, and a focal length of the sixth lens element is f6, the following condition is satisfied: $|f/f4|+|f/f5|+|f/f6|<1.35$. Therefore, it is favorable for the fourth through sixth lens elements to collaborate together so as to adjust the size distribution and reduce aberrations such as spherical aberration generated by a single lens element. Moreover, the following condition can also be satisfied: $|f/f4|+|f/f5|+|f/f6|<1.20$. Moreover, the following condition can also be satisfied: $|f/f4|+|f/f5|+|f/f6|<1.00$. Moreover, the following condition can also be satisfied: $|f/f4|+|f/f5|+|f/f6|<0.75$.

When a central thickness of the fifth lens element is CT5, and a central thickness of the sixth lens element is CT6, the following condition can be satisfied: $0.10<CT5/CT6<0.75$. Therefore, it is favorable for the fifth and sixth lens elements to collaborate with each other so as to correct aberrations. Moreover, the following condition can also be satisfied: $0.20<CT5/CT6<0.65$.

When an axial distance between the object-side surface of the first lens element and an image surface is TL, and a maximum image height of the optical imaging lens assembly (half of a diagonal length of an effective photosensitive area of an image sensor) is ImgH, the following condition can be satisfied: $0.80<TL/ImgH<1.70$. Therefore, it is favorable for obtaining a balance between reducing the total track length and enlarging the image surface of the optical imaging lens assembly. Moreover, the following condition can also be satisfied: $1.00<TL/ImgH<1.50$.

When the central thickness of the fifth lens element is CT5, and an axial distance between the fifth lens element and the sixth lens element is T56, the following condition can be satisfied: $0.10<CT5/T56<1.25$. Therefore, it is favorable for adjusting the central thickness of the fifth lens element and the axial distance between the fifth lens element and the sixth lens element so as to reduce the size of the optical imaging lens assembly. Moreover, the following condition can also be satisfied: $0.25<CT5/T56<1.00$.

When the focal length of the optical imaging lens assembly is f, and a focal length of the first lens element is f1, the following condition can be satisfied: $|f/f1|<1.80$. Therefore, it is favorable for preventing overly strong refractive power of the first lens element, thereby preventing excessive aberrations. Moreover, the following condition can also be satisfied: $|f/f1|<1.60$. Moreover, the following condition can also be satisfied: $|f/f1|<1.40$.

When a curvature radius of the object-side surface of the fourth lens element is R7, and an axial distance between the object-side surface of the first lens element and the image-side surface of the seventh lens element is TD, the following condition can be satisfied: $2.80<|R7|/TD$. Therefore, it is favorable for adjusting the size distribution of the optical imaging lens assembly so as to obtain a balance between the field of view and the product size. Moreover, the following condition can also be satisfied: $3.60<|R7|/TD$.

When the maximum image height of the optical imaging lens assembly is ImgH, and an axial distance between the image-side surface of the seventh lens element and the image surface is BL, the following condition can be satisfied: $5.0<ImgH/BL$. Therefore, it is favorable for adjusting the image surface size and back focal length so as to have a proper incident angle of light on the image surface, thereby improving the response efficiency of an image sensor.

When an Abbe number of the second lens element is V2, the following condition can be satisfied: $10.0<V2<34.0$. Therefore, it is favorable for adjusting the material of the second lens element so as to reduce chromatic aberration. Moreover, the following condition can also be satisfied: $14.0<V2<28.0$.

When an Abbe number of the fourth lens element is V4, the following condition can be satisfied: $10.0<V4<34.0$. Therefore, it is favorable for adjusting the material of the fourth lens element so as to reduce chromatic aberration. Moreover, the following condition can also be satisfied: $14.0<V4<23.5$.

When an axial distance between the sixth lens element and the seventh lens element is T67, and the central thickness of the sixth lens element is CT6, the following condition can be satisfied: $0<T67/CT6<1.0$. Therefore, it is favorable for the sixth and seventh lens elements to collaborate with each other so as to correct off-axis aberrations. Moreover, the following condition can also be satisfied: $0.15<T67/CT6<0.85$.

When the focal length of the optical imaging lens assembly is f, and the focal length of the sixth lens element is f6, the following condition can be satisfied: $-0.22<f/f6<0.35$. Therefore, it is favorable for the sixth lens element to have proper refractive power so as to correct off-axis aberrations. Moreover, the following condition can also be satisfied: $-0.17<f/f6<0.30$.

When the Abbe number of the second lens element is V2, the Abbe number of the fourth lens element is V4, and the Abbe number of the sixth lens element is V6, the following condition can be satisfied: $30.0<V2+V4+V6<90.0$. Therefore, it is favorable for selecting proper materials for manufacturing the lens elements in the optical imaging lens assembly so as to correct aberrations such as chromatic aberration. Moreover, the following condition can also be satisfied: $45.0<V2+V4+V6<75.0$.

When the focal length of the optical imaging lens assembly is f, and the focal length of the fourth lens element is f4, the following condition can be satisfied: $-0.50<f/f4<0.32$. Therefore, it is favorable for balancing the refractive power distribution on the object side and the image side of the optical imaging lens assembly. Moreover, the following condition can also be satisfied: $-0.40<f/f4<0.18$.

When an Abbe number of the first lens element is V1, the Abbe number of the second lens element is V2, an Abbe number of the third lens element is V3, the Abbe number of the fourth lens element is V4, an Abbe number of the fifth lens element is V5, the Abbe number of the sixth lens element is V6, an Abbe number of the seventh lens element is V7, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, and a refractive index of the i-th lens element is Ni, at least one lens element of the optical imaging lens assembly can satisfy the following condition: $4.50<Vi/Ni<11.8$, wherein i=1, 2, 3, 4, 5, 6 or 7. Therefore, it is favorable for providing a proper lens material distribution of the optical imaging lens assembly so as to further correct aberrations. Moreover, at least two lens elements of the optical imaging lens assembly can satisfy the following condition: $4.50<Vi/Ni<11.8$, wherein i=1, 2, 3, 4, 5, 6 or 7. Moreover, at least three lens elements of the optical imaging lens assembly can satisfy the following condition: $4.50<Vi/Ni<11.8$, wherein i=1, 2, 3, 4, 5, 6 or 7.

When the Abbe number of the fifth lens element is V5, the following condition can be satisfied: $10.0<V5<65.0$. Therefore, it is favorable for adjusting the material of the fifth lens element so as to reduce material costs. Moreover, the following condition can also be satisfied: $30.0<V5<60.0$.

When the focal length of the optical imaging lens assembly is f, and the focal length of the fifth lens element is f5, the following condition can be satisfied: $-0.33<f/f5<0.75$. Therefore, it is favorable for adjusting the refractive power of the fifth lens element so as to provide required size of the optical imaging lens assembly at the image side. Moreover, the following condition can also be satisfied: $-0.28<f/f5<0.45$.

When the axial distance between the object-side surface of the first lens element and the image surface is TL, the following condition can be satisfied: $2.0$ [mm]$<TL<8.5$ [mm]. Therefore, it is favorable for the optical imaging lens assembly to have a proper total track length for various applications. Moreover, the following condition can also be satisfied: $3.5$ [mm]$<TL<7.0$ [mm].

When the axial distance between the object-side surface of the first lens element and the image surface is TL, and the focal length of the optical imaging lens assembly is f, the following condition can be satisfied: $0.70<TL/f<1.30$. Therefore, it is favorable for obtaining a balance between the field of view and the product size.

When half of a maximum field of view of the optical imaging lens assembly is HFOV, the following condition can be satisfied: $32.5$ [deg.]$<HFOV<45.0$ [deg.]. Therefore, it is favorable for obtaining a wide angle configuration and preventing distortion caused by overly large field of view.

When a sum of central thicknesses of all lens elements of the optical imaging lens assembly is $\Sigma CT$, and a sum of axial distances between each of all adjacent lens elements of the optical imaging lens assembly is $\Sigma AT$, the following condition can be satisfied: $1.50<\Sigma CT/\Sigma AT<2.30$. Therefore, it is favorable for adjusting the distribution of the lens elements so as to reduce the size of the optical imaging lens assembly.

When an axial distance between the first lens element and the second lens element is T12, and the axial distance between the sixth lens element and the seventh lens element is T67, the following condition can be satisfied: $0.35<T12/T67<2.45$. Therefore, it is favorable for adjusting the distribution of lens elements on the object side and the image side so as to obtain a balance among the field of view, size and image quality of the optical imaging lens assembly. Moreover, the following condition can also be satisfied: $0.45<T12/T67<1.70$.

When a curvature radius of the object-side surface of the first lens element is R1, and a curvature radius of the image-side surface of the first lens element is R2, the following condition can be satisfied: $1.00<|R2/R1|<8.00$. Therefore, it is favorable for adjusting the surface shape of the first lens element so as to provide proper refractive power of the first lens element. Moreover, the following condition can also be satisfied: $1.60<|R2/R1|<5.50$.

When the Abbe number of the third lens element is V3, the following condition can be satisfied: $10.0<V3<65.0$. Therefore, it is favorable for adjusting the material of the third lens element so as to reduce material costs. Moreover, the following condition can also be satisfied: $30.0<V3<60.0$.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the optical imaging lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, the optical imaging lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
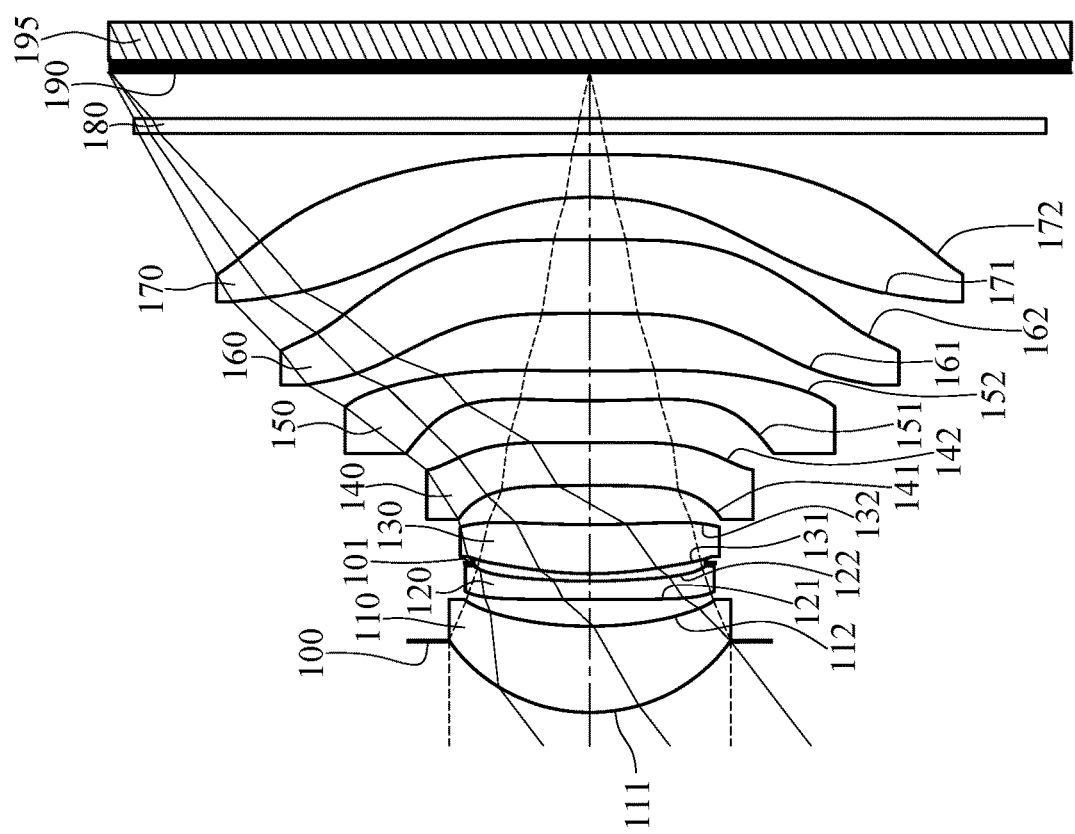
FIG. 1 is a schematic view of an image capturing unit according to the 1st embodiment of the present disclosure.
Figure 2:
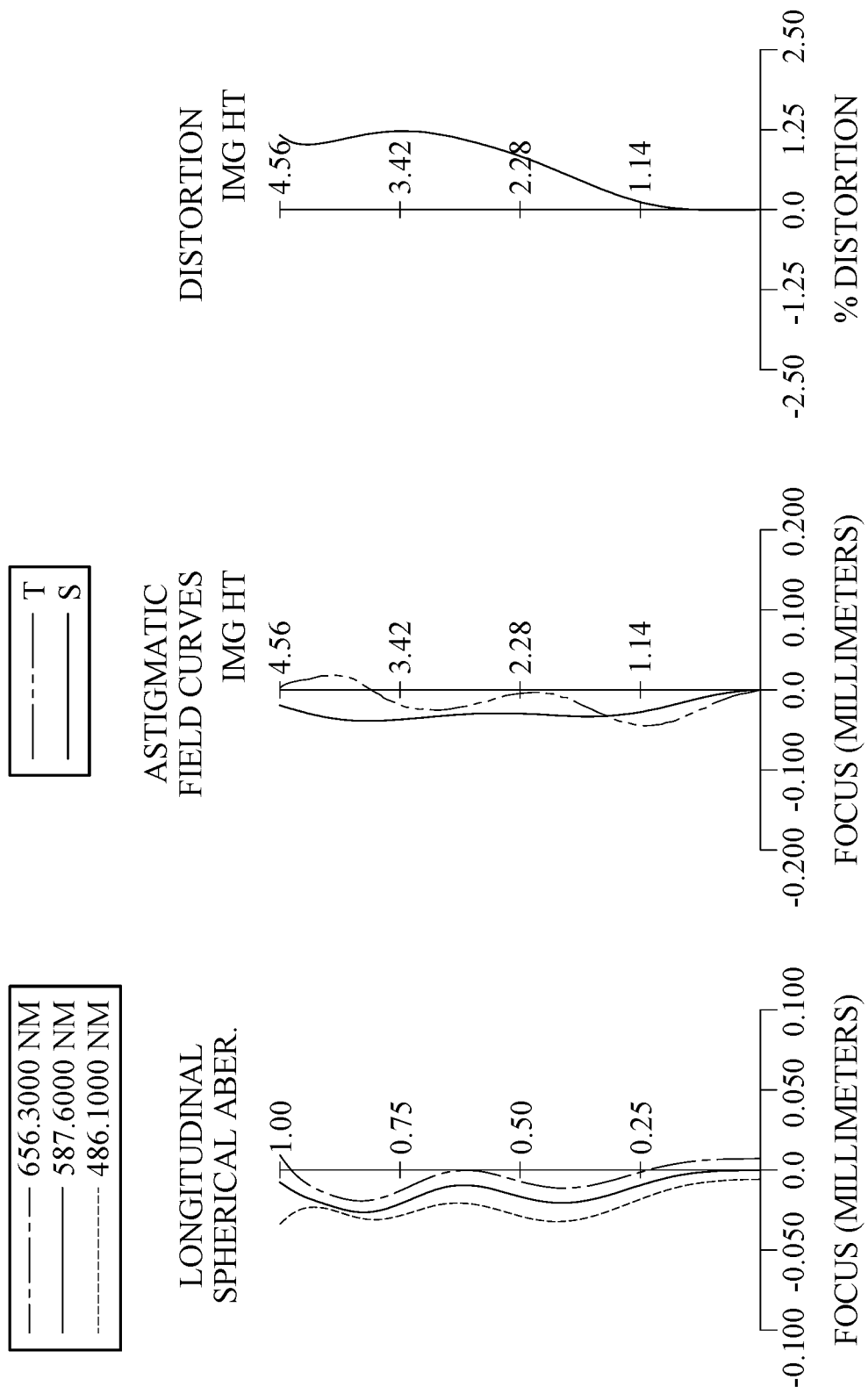
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 195. The optical imaging lens assembly includes, in order from an object side to an image side, an aperture stop 100, a first lens element 110, a second lens element 120, a stop 101, a third lens element 130, a fourth lens element 140, a fifth lens element 150, a sixth lens element 160, a seventh lens element 170, a filter 180 and an image surface 190. The optical imaging lens assembly includes seven lens elements (110, 120, 130, 140, 150, 160 and 170) with no additional lens element disposed between each of the adjacent seven lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has one inflection point in an off-axis region thereof.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has one inflection point in an off-axis region thereof.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric. The image-side surface 142 of the fourth lens element 140 has two inflection points in an off-axis region thereof.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has one inflection point in an off-axis region thereof. The image-side surface 152 of the fifth lens element 150 has one inflection point in an off-axis region thereof.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has three inflection points in an off-axis region thereof. The image-side surface 162 of the sixth lens element 160 has three inflection points in an off-axis region thereof.

The seventh lens element 170 with negative refractive power has an object-side surface 171 being concave in a paraxial region thereof and an image-side surface 172 being convex in a paraxial region thereof. The seventh lens element 170 is made of plastic material and has the object-side surface 171 and the image-side surface 172 being both aspheric. The object-side surface 171 of the seventh lens element 170 has two inflection points in an off-axis region thereof. The image-side surface 172 of the seventh lens element 170 has one inflection point in an off-axis region thereof.

The filter 180 is made of glass material and located between the seventh lens element 170 and the image surface 190, and will not affect the focal length of the optical imaging lens assembly. The image sensor 195 is disposed on or near the image surface 190 of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=5.91 millimeters (mm), Fno=2.20, HFOV=37.4 degrees (deg.).

When an Abbe number of the second lens element 120 is V2, the following condition is satisfied: V2=21.8.

When an Abbe number of the third lens element 130 is V3, the following condition is satisfied: V3=56.0.

When an Abbe number of the fourth lens element 140 is V4, the following condition is satisfied: V4=18.4.

When an Abbe number of the fifth lens element 150 is V5, the following condition is satisfied: V5=30.2.

When an Abbe number of the sixth lens element 160 is V6, the following condition is satisfied: V6=18.4.

When the Abbe number of the second lens element 120 is V2, the Abbe number of the fourth lens element 140 is V4, and the Abbe number of the sixth lens element 160 is V6, the following condition is satisfied: V2+V4+V6=58.6.

When an Abbe number of the first lens element 110 is V1, and a refractive index of the first lens element 110 is N1, the following condition is satisfied: V1/N1=39.22.

When the Abbe number of the second lens element 120 is V2, and a refractive index of the second lens element 120 is N2, the following condition is satisfied: V2/N2=13.21.

When the Abbe number of the third lens element 130 is V3, and a refractive index of the third lens element 130 is N3, the following condition is satisfied: V3/N3=36.26.

When the Abbe number of the fourth lens element 140 is V4, and a refractive index of the fourth lens element 140 is N4, the following condition is satisfied: V4/N4=10.91.

When the Abbe number of the fifth lens element 150 is V5, and a refractive index of the fifth lens element 150 is N5, the following condition is satisfied: V5/N5=19.11.

When the Abbe number of the sixth lens element 160 is V6, and a refractive index of the sixth lens element 160 is N6, the following condition is satisfied: V6/N6=10.91.

When an Abbe number of the seventh lens element 170 is V7, and a refractive index of the seventh lens element 170 is N7, the following condition is satisfied: V7/N7=39.22.

When a sum of central thicknesses of all lens elements of the optical imaging lens assembly is ΣCT, and a sum of axial distances between each of all adjacent lens elements of the optical imaging lens assembly is ΣAT, the following condition is satisfied: ΣCT/ΣAT=1.59. In this embodiment, an axial distance between two adjacent lens elements is an air gap in a paraxial region between the two adjacent lens elements. In addition, in this embodiment, ΣCT is a sum of the central thicknesses of the first lens element 110, the second lens element 120, the third lens element 130, the fourth lens element 140, the fifth lens element 150, the sixth lens element 160 and the seventh lens element 170; ΣAT is a sum of the axial distance between the first lens element 110 and the second lens element 120, the axial distance between the second lens element 120 and the third lens element 130, the axial distance between the third lens element 130 and the fourth lens element 140, the axial distance between the fourth lens element 140 and the fifth lens element 150, the axial distance between the fifth lens element 150 and the sixth lens element 160, and the axial distance between the sixth lens element 160 and the seventh lens element 170.

When the central thickness of the fifth lens element 150 is CT5, and the central thickness of the sixth lens element 160 is CT6, the following condition is satisfied: CT5/CT6=0.40.

When the central thickness of the fifth lens element 150 is CT5, and the axial distance between the fifth lens element 150 and the sixth lens element 160 is T56, the following condition is satisfied: CT5/T56=0.51.

When the axial distance between the first lens element 110 and the second lens element 120 is T12, and the axial distance between the sixth lens element 160 and the seventh lens element 170 is T67, the following condition is satisfied: T12/T67=0.63.

When the axial distance between the sixth lens element 160 and the seventh lens element 170 is T67, and the central thickness of the sixth lens element 160 is CT6, the following condition is satisfied: T67/CT6=0.57.

When an axial distance between the object-side surface 111 of the first lens element 110 and the image surface 190 is TL, the following condition is satisfied: TL=6.10 [mm].

When the axial distance between the object-side surface 111 of the first lens element 110 and the image surface 190 is TL, and the focal length of the optical imaging lens assembly is f, the following condition is satisfied: TL/f=1.03.

When the axial distance between the object-side surface 111 of the first lens element 110 and the image surface 190 is TL, and a maximum image height of the optical imaging lens assembly is ImgH, the following condition is satisfied: TL/ImgH=1.34.

When a curvature radius of the object-side surface 111 of the first lens element 110 is R1, and a curvature radius of the image-side surface 112 of the first lens element 110 is R2, the following condition is satisfied: |R2/R1|=2.24.

When a curvature radius of the object-side surface 141 of the fourth lens element 140 is R7, and an axial distance between the object-side surface 111 of the first lens element 110 and the image-side surface 172 of the seventh lens element 170 is TD, the following condition is satisfied: |R7|/TD=34.99.

When a curvature radius of the object-side surface 171 of the seventh lens element 170 is R13, and a curvature radius of the image-side surface 172 of the seventh lens element 170 is R14, the following condition is satisfied: |R14/R13|=21.14.

When the focal length of the optical imaging lens assembly is f, and a focal length of the first lens element 110 is f1, the following condition is satisfied: |f/f1|=1.16.

When the focal length of the optical imaging lens assembly is f, and a focal length of the fourth lens element 140 is f4, the following condition is satisfied: f/f4=−0.21.

When the focal length of the optical imaging lens assembly is f, and a focal length of the fifth lens element 150 is f5, the following condition is satisfied: f/f5=0.15.

When the focal length of the optical imaging lens assembly is f, and a focal length of the sixth lens element 160 is f6, the following condition is satisfied: f/f6=−0.03.

When the focal length of the optical imaging lens assembly is f, the focal length of the fourth lens element 140 is f4, the focal length of the fifth lens element 150 is f5, and the focal length of the sixth lens element 160 is f6, the following condition is satisfied: |f/f4|+|f/f5|+|f/f6|=0.39.

When the maximum image height of the optical imaging lens assembly is ImgH, and an axial distance between the image-side surface 172 of the seventh lens element 170 and the image surface 190 is BL, the following condition is satisfied: ImgH/BL=5.85.

The detailed optical data of the 1st embodiment are shown in Table 1 and the aspheric surface data are shown in Table 2 below.

TABLE 1

1st Embodiment
f = 5.91 mm, Fno = 2.20, HFOV = 37.4 deg.

| Surface # |         | Curvature Radius |       | Thickness | Material | Index | Abbe # | Focal Length |
|-----------|---------|------------------|-------|-----------|----------|-------|--------|--------------|
| 0         | Object  | Plano            |       | Infinity  |          |       |        |              |
| 1         | Ape. Stop | Plano          |       | −0.680    |          |       |        |              |
| 2         | Lens 1  | 1.701            | (ASP) | 0.822     | Plastic  | 1.530 | 60.0   | 5.10         |
| 3         |         | 3.818            | (ASP) | 0.254     |          |       |        |              |
| 4         | Lens 2  | −353.336         | (ASP) | 0.180     | Plastic  | 1.650 | 21.8   | −9.69        |
| 5         |         | 6.410            | (ASP) | 0.178     |          |       |        |              |
| 6         | Stop    | Plano            |       | −0.107    |          |       |        |              |
| 7         | Lens 3  | 3.233            | (ASP) | 0.467     | Plastic  | 1.544 | 56.0   | 8.87         |
| 8         |         | 9.300            | (ASP) | 0.374     |          |       |        |              |
| 9         | Lens 4  | −186.380         | (ASP) | 0.406     | Plastic  | 1.686 | 18.4   | −27.64       |
| 10        |         | 21.124           | (ASP) | 0.403     |          |       |        |              |
| 11        | Lens 5  | 10.204           | (ASP) | 0.280     | Plastic  | 1.582 | 30.2   | 39.06        |
| 12        |         | 18.313           | (ASP) | 0.550     |          |       |        |              |
| 13        | Lens 6  | 218.818          | (ASP) | 0.708     | Plastic  | 1.686 | 18.4   | −199.17      |
| 14        |         | 84.001           | (ASP) | 0.405     |          |       |        |              |
| 15        | Lens 7  | −3.232           | (ASP) | 0.406     | Plastic  | 1.530 | 60.0   | −6.41        |
| 16        |         | −68.330          | (ASP) | 0.200     |          |       |        |              |
| 17        | Filter  | Plano            |       | 0.145     | Glass    | 1.517 | 64.2   | —            |
| 18        |         | Plano            |       | 0.434     |          |       |        |              |
| 19        | Image   | Plano            |       | —         |          |       |        |              |

Note:
Reference wavelength is 587.6 nm (d-line).
An effective radius of the stop 101 (Surface 6) is 1.110 mm.

TABLE 2

Aspheric Coefficients

| Surface # | 2 | 3 | 4 | 5 | 7 |
|---|---|---|---|---|---|
| k = | 2.1524E−01 | 5.3406E+00 | −2.2027E−12 | −3.6905E+01 | −1.2246E+00 |
| A4 = | −9.7148E−03 | 2.5764E−03 | 8.4319E−03 | −3.6772E−02 | −7.9759E−02 |
| A6 = | 2.1527E−02 | −5.3325E−03 | 2.6114E−02 | 1.1198E−01 | 6.1148E−02 |
| A8 = | −4.4696E−02 | 9.1336E−03 | −3.2446E−02 | −9.7689E−02 | 2.0405E−02 |
| A10 = | 5.0346E−02 | −7.9891E−03 | 2.2748E−02 | 2.5162E−02 | −1.2273E−01 |
| A12 = | −3.2668E−02 | −1.1603E−03 | −1.3687E−03 | 5.1688E−02 | 1.2727E−01 |
| A14 = | 1.1141E−02 | 4.0722E−03 | — | −3.8306E−02 | −5.0000E−02 |
| A16 = | −1.5436E−03 | — | — | 1.0026E−02 | 6.5490E−03 |

| Surface # | 8 | 9 | 10 | 11 | 12 |
|---|---|---|---|---|---|
| k = | 1.7068E+01 | 1.0000E+01 | −7.2903E+01 | 6.9994E+00 | 4.5896E+00 |
| A4 = | −3.6418E−02 | −6.0377E−02 | −6.5210E−02 | −2.4870E−02 | −1.8677E−02 |
| A6 = | 1.2573E−02 | −1.5736E−01 | −4.5878E−02 | −4.8960E−02 | −2.0443E−02 |
| A8 = | −3.5136E−02 | 3.9095E−01 | 8.3252E−02 | 3.6368E−02 | 1.7092E−02 |
| A10 = | 4.1496E−02 | −5.5771E−01 | −7.5799E−02 | −1.7813E−02 | −5.8780E−03 |
| A12 = | −3.5977E−02 | 4.2510E−01 | 3.5836E−02 | 4.3105E−03 | 1.0491E−03 |
| A14 = | 1.5194E−02 | −1.6799E−01 | −7.6647E−03 | −4.1770E−04 | −9.4069E−05 |
| A16 = | −2.1784E−03 | 2.6185E−02 | 5.8198E−04 | 1.0007E−05 | 3.2057E−06 |

| Surface # | 13 | 14 | 15 | 16 |
|---|---|---|---|---|
| k = | −1.7337E−12 | −1.1679E+01 | −7.9524E−01 | 9.0000E+01 |
| A4 = | −6.9170E−02 | −5.3726E−02 | −3.2349E−02 | −3.9728E−02 |
| A6 = | 7.8059E−03 | 4.0841E−03 | 1.2548E−02 | 1.8930E−02 |
| A8 = | 1.2604E−03 | 2.0511E−03 | −1.1601E−03 | −6.0834E−03 |
| A10 = | −5.0514E−05 | −6.4013E−04 | −1.0305E−04 | 1.2443E−03 |
| A12 = | −9.9790E−05 | 4.8739E−05 | 3.6304E−05 | −1.6602E−04 |
| A14 = | 2.2707E−05 | 6.5103E−06 | −4.0445E−06 | 1.4465E−05 |
| A16 = | −2.1851E−06 | −1.3662E−06 | 2.3930E−07 | −7.9751E−07 |
| A18 = | 9.7809E−08 | 8.3944E−08 | −7.5216E−09 | 2.5348E−08 |
| A20 = | −1.6351E−09 | −1.7756E−09 | 9.8139E−11 | −3.5340E−10 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
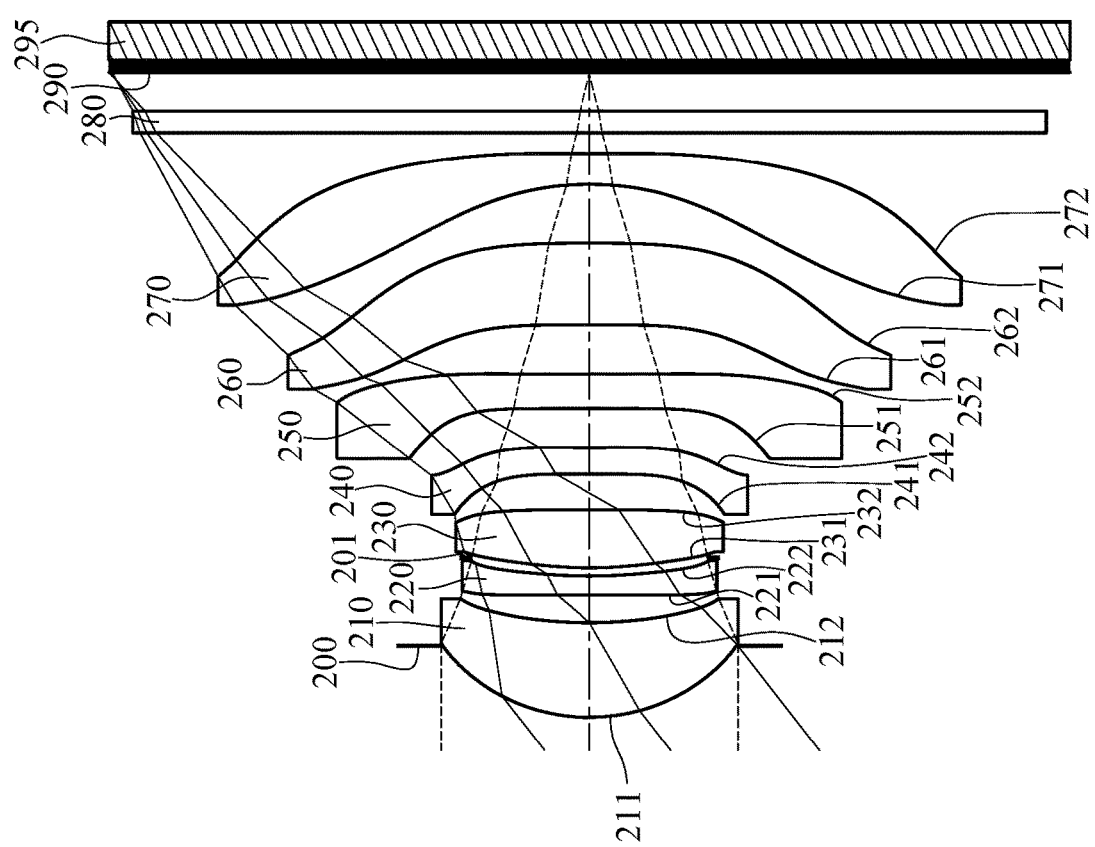
FIG. 3 is a schematic view of an image capturing unit according to the 2nd embodiment of the present disclosure.
Figure 4:
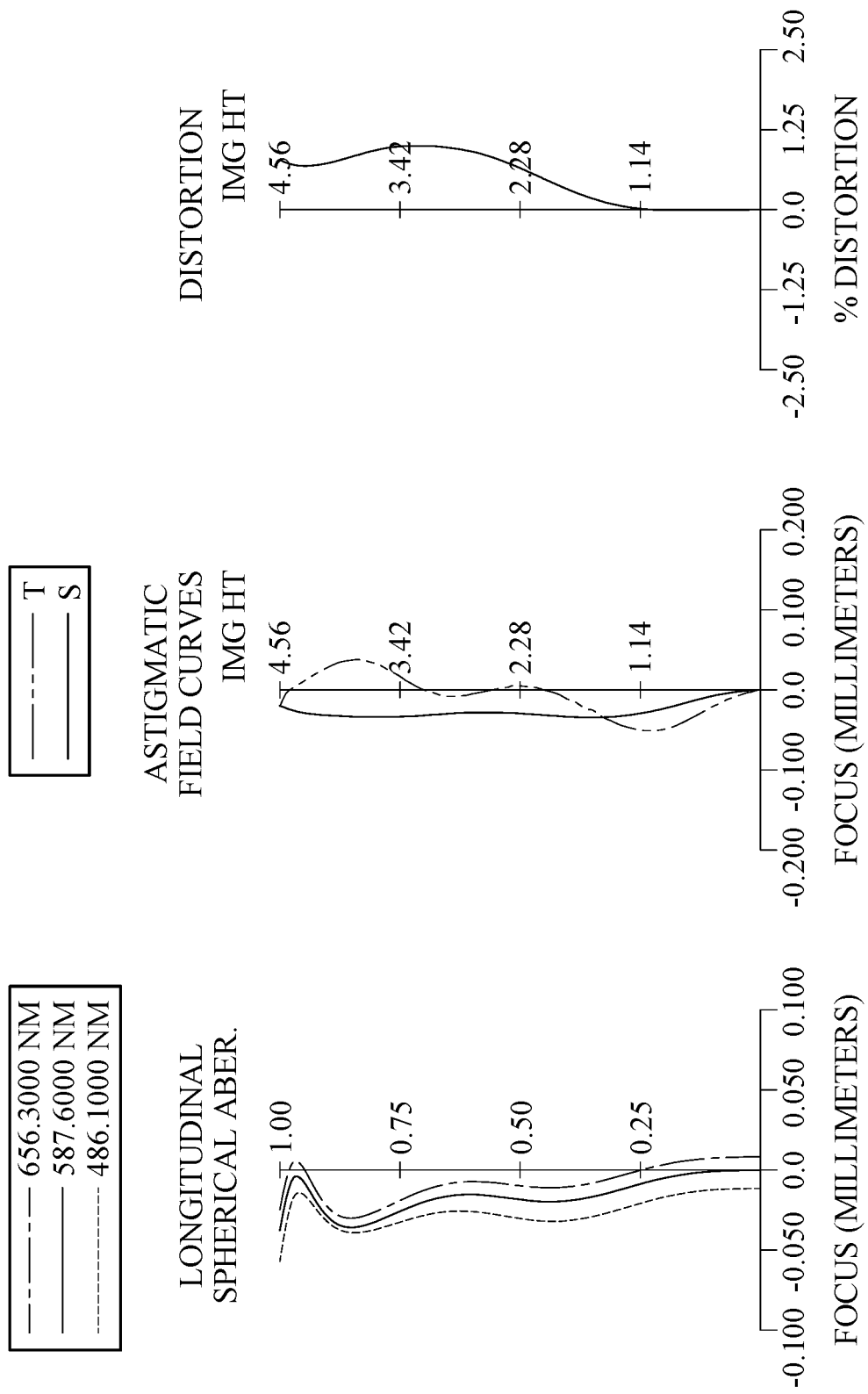
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 295. The optical imaging lens assembly includes, in order from an object side to an image side, an aperture stop 200, a first lens element 210, a second lens element 220, a stop 201, a third lens element 230, a fourth lens element 240, a fifth lens element 250, a sixth lens element 260, a seventh lens element 270, a filter 280 and an image surface 290. The optical imaging lens assembly includes seven lens elements (210, 220, 230, 240, 250, 260 and 270) with no additional lens element disposed between each of the adjacent seven lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has two inflection points in an off-axis region thereof.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has one inflection point in an off-axis region thereof. The image-side surface 242 of the fourth lens element 240 has two inflection points in an off-axis region thereof.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has two inflection points in an off-axis region thereof. The image-side surface 252 of the fifth lens element 250 has two inflection points in an off-axis region thereof.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has three inflection points in an off-axis region thereof. The image-side surface 262 of the sixth lens element 260 has two inflection points in an off-axis region thereof.

The seventh lens element 270 with negative refractive power has an object-side surface 271 being concave in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has one inflection point in an off-axis region thereof. The image-side surface 272 of the seventh lens element 270 has two inflection points in an off-axis region thereof.

The filter 280 is made of glass material and located between the seventh lens element 270 and the image surface 290, and will not affect the focal length of the optical imaging lens assembly. The image sensor 295 is disposed on or near the image surface 290 of the optical imaging lens assembly.

The detailed optical data of the 2nd embodiment are shown in Table 3 and the aspheric surface data are shown in Table 4 below.

TABLE 3

2nd Embodiment
f = 5.86 mm, Fno = 2.07, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.680 | | | | |
| 2 | Lens 1 | 1.819 | (ASP) | 0.902 | Plastic | 1.545 | 56.1 | 5.04 |
| 3 | | 4.450 | (ASP) | 0.262 | | | | |
| 4 | Lens 2 | 66.518 | (ASP) | 0.180 | Plastic | 1.642 | 22.5 | −8.35 |
| 5 | | 4.951 | (ASP) | 0.175 | | | | |
| 6 | Stop | Plano | | −0.097 | | | | |
| 7 | Lens 3 | 3.980 | (ASP) | 0.554 | Plastic | 1.544 | 56.0 | 7.17 |
| 8 | | −193.050 | (ASP) | 0.341 | | | | |
| 9 | Lens 4 | 103.451 | (ASP) | 0.254 | Plastic | 1.688 | 18.7 | −32.29 |
| 10 | | 18.272 | (ASP) | 0.375 | | | | |
| 11 | Lens 5 | −71.314 | (ASP) | 0.330 | Plastic | 1.566 | 37.4 | −184.31 |
| 12 | | −225.734 | (ASP) | 0.465 | | | | |
| 13 | Lens 6 | 219.298 | (ASP) | 0.779 | Plastic | 1.688 | 18.7 | 30.61 |
| 14 | | −23.262 | (ASP) | 0.562 | | | | |
| 15 | Lens 7 | −2.930 | (ASP) | 0.295 | Plastic | 1.544 | 56.0 | −5.08 |
| 16 | | 49.816 | (ASP) | 0.200 | | | | |
| 17 | Filter | Plano | | 0.210 | Glass | 1.517 | 64.2 | — |
| 18 | | Plano | | 0.364 | | | | |
| 19 | Image | Plano | | — | | | | |

Note:
Reference wavelength is 587.6 nm (d-line).
An effective radius of the stop 201 (Surface 6) is 1.140 mm.

TABLE 4

Aspheric Coefficients

| Surface # | 2 | 3 | 4 | 5 | 7 |
|---|---|---|---|---|---|
| k = | 2.3914E−01 | 5.7812E+00 | −5.0085E+01 | −4.6988E+01 | 6.9316E−01 |
| A4 = | −1.3041E−02 | 5.3905E−05 | −2.0992E−02 | −1.0905E−02 | −3.9694E−02 |
| A6 = | 2.9477E−02 | 7.3305E−03 | 3.3092E−02 | 6.6636E−02 | −3.0730E−03 |
| A8 = | −5.2056E−02 | −2.1398E−02 | −3.3359E−02 | −1.5752E−01 | 6.3767E−02 |
| A10 = | 4.8984E−02 | 2.9210E−02 | 2.5448E−02 | 2.5737E−01 | −1.1676E−01 |
| A12 = | −2.6044E−02 | −2.0214E−02 | −4.9259E−03 | −2.3378E−01 | 1.0060E−01 |
| A14 = | 7.1713E−03 | 6.8263E−03 | — | 1.2273E−01 | −3.6905E−02 |
| A16 = | −7.8624E−04 | — | — | −2.7277E−02 | 4.5503E−03 |

| Surface # | 8 | 9 | 10 | 11 | 12 |
|---|---|---|---|---|---|
| k = | 0.0000E+00 | −9.0000E+01 | −1.0000E+00 | −9.0000E+01 | −9.0000E+01 |
| A4 = | −2.6490E−02 | −6.7482E−02 | −6.2997E−02 | 2.7826E−02 | 1.9247E−02 |
| A6 = | 3.6699E−03 | −2.4288E−01 | −1.3089E−01 | −6.5051E−02 | −2.2506E−02 |
| A8 = | −1.3889E−02 | 5.2694E−01 | 2.1177E−01 | 2.9403E−02 | 9.2455E−03 |
| A10 = | 1.1002E−02 | −6.4955E−01 | −1.8620E−01 | −9.1319E−03 | −2.2794E−03 |
| A12 = | −9.0059E−03 | 4.3901E−01 | 9.0766E−02 | 8.3126E−04 | 3.4668E−04 |

TABLE 4-continued

| Aspheric Coefficients | | | | |
|---|---|---|---|---|
| A14 = | 2.6289E−03 | −1.5296E−01 | −2.1146E−02 | 2.1873E−04 | −2.9031E−05 |
| A16 = | −4.6653E−05 | 2.1091E−02 | 1.8080E−03 | −3.3591E−05 | 9.2801E−07 |

| Surface # | 13 | 14 | 15 | 16 |
|---|---|---|---|---|
| k = | −9.0000E+01 | 1.8045E+01 | −1.1227E+00 | −9.0000E+01 |
| A4 = | −5.4854E−02 | −3.7731E−02 | −3.2055E−02 | −4.2696E−02 |
| A6 = | 6.8998E−03 | 3.7805E−03 | 1.6656E−02 | 1.8369E−02 |
| A8 = | −2.5694E−03 | −1.8571E−03 | −3.4970E−03 | −5.0286E−03 |
| A10 = | 1.8504E−03 | 1.4462E−03 | 4.4787E−04 | 8.6533E−04 |
| A12 = | −5.3033E−04 | −5.2509E−04 | −3.8430E−05 | −9.8800E−05 |
| A14 = | 7.8110E−05 | 1.0069E−04 | 2.3600E−06 | 7.6279E−06 |
| A16 = | −6.4684E−06 | −1.0463E−05 | −1.0649E−07 | −3.9536E−07 |
| A18 = | 2.8855E−07 | 5.5498E−07 | 3.2036E−09 | 1.2715E−08 |
| A20 = | −5.4071E−09 | −1.1756E−08 | −4.5877E−11 | −1.9024E−10 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.86 | CT5/CT6 | 0.42 |
| Fno | 2.07 | CT5/T56 | 0.71 |
| HFOV [deg.] | 37.8 | T12/T67 | 0.47 |
| V2 | 22.5 | T67/CT6 | 0.72 |
| V3 | 56.0 | TL [mm] | 6.15 |
| V4 | 18.7 | TL/f | 1.05 |
| V5 | 37.4 | TL/ImgH | 1.35 |
| V6 | 18.7 | |R2/R1| | 2.45 |
| V2 + V4 + V6 | 59.9 | |R7|/TD | 19.24 |
| V1/N1 | 36.30 | |R14/R13| | 17.00 |
| V2/N2 | 13.70 | |f/f1| | 1.16 |
| V3/N3 | 36.26 | f/f4 | −0.18 |
| V4/N4 | 11.08 | f/f5 | −0.03 |
| V5/N5 | 23.91 | f/f6 | 0.19 |
| V6/N6 | 11.08 | |f/f4| + |f/f5| + |f/f6| | 0.40 |
| V7/N7 | 36.26 | ImgH/BL | 5.89 |
| ΣCT/ΣAT | 1.58 | — | — |

3rd Embodiment

Figure 5:
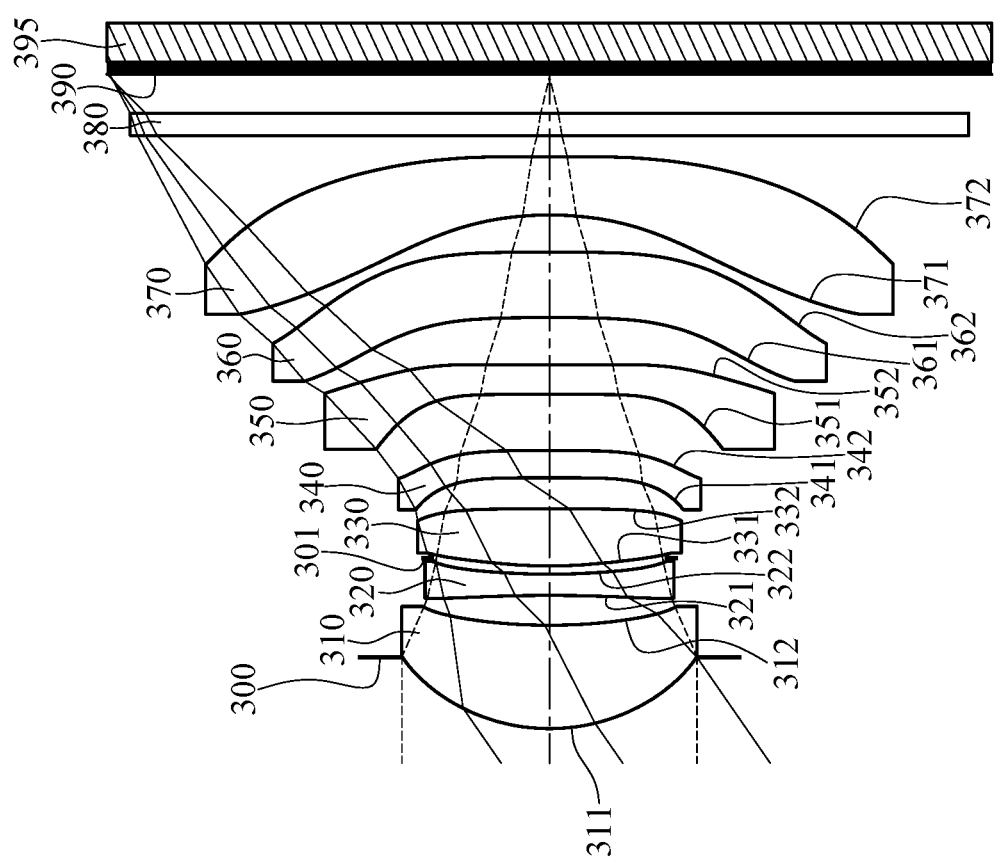
FIG. 5 is a schematic view of an image capturing unit according to the 3rd embodiment of the present disclosure.
Figure 6:
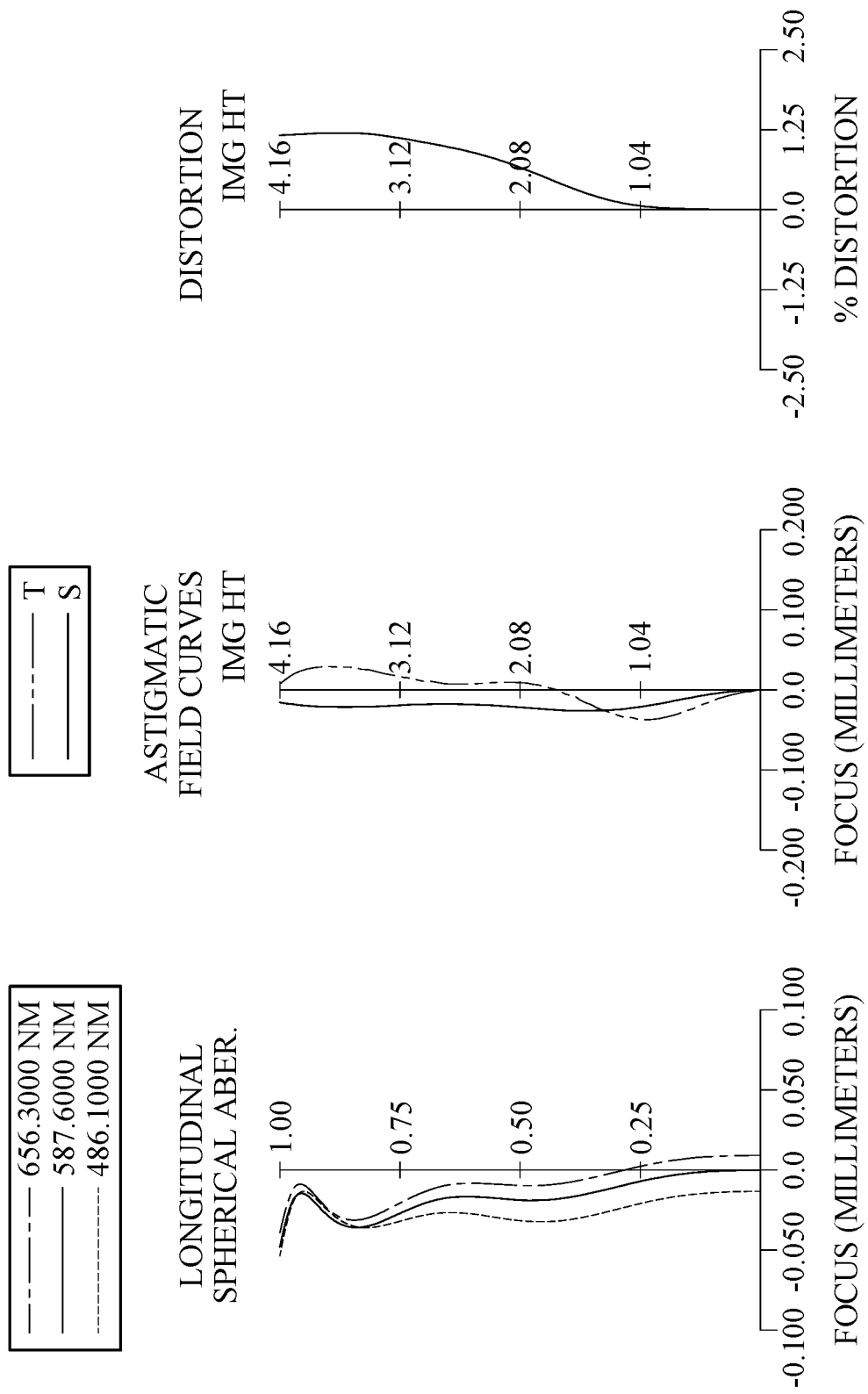
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 395. The optical imaging lens assembly includes, in order from an object side to an image side, an aperture stop 300, a first lens element 310, a second lens element 320, a stop 301, a third lens element 330, a fourth lens element 340, a fifth lens element 350, a sixth lens element 360, a seventh lens element 370, a filter 380 and an image surface 390. The optical imaging lens assembly includes seven lens elements (310, 320, 330, 340, 350, 360 and 370) with no additional lens element disposed between each of the adjacent seven lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has one inflection point in an off-axis region thereof.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has one inflection point in an off-axis region thereof. The image-side surface 342 of the fourth lens element 340 has one inflection point in an off-axis region thereof.

The fifth lens element 350 has an object-side surface 351 being planar in a paraxial region thereof and an image-side surface 352 being planar in a paraxial region thereof. The fifth lens element 350 is made of plastic material and has the object-side surface 351 and the image-side surface 352 being both aspheric. The object-side surface 351 of the fifth lens element 350 has one inflection point in an off-axis region thereof. The image-side surface 352 of the fifth lens element 350 has one inflection point in an off-axis region thereof.

The sixth lens element 360 with negative refractive power has an object-side surface 361 being concave in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has one inflection point in an off-axis region thereof. The image-side surface 362 of the sixth lens element 360 has two inflection points in an off-axis region thereof.

The seventh lens element 370 with negative refractive power has an object-side surface 371 being concave in a paraxial region thereof and an image-side surface 372 being planar in a paraxial region thereof. The seventh lens element 370 is made of plastic material and has the object-side surface 371 and the image-side surface 372 being both aspheric. The object-side surface 371 of the seventh lens element 370 has one inflection point in an off-axis region thereof. The image-side surface 372 of the seventh lens element 370 has one inflection point in an off-axis region thereof.

The filter 380 is made of glass material and located between the seventh lens element 370 and the image surface 390, and will not affect the focal length of the optical imaging lens assembly. The image sensor 395 is disposed on or near the image surface 390 of the optical imaging lens assembly.

The detailed optical data of the 3rd embodiment are shown in Table 5 and the aspheric surface data are shown in Table 6 below.

TABLE 5

3rd Embodiment
f = 5.96 mm, Fno = 2.14, HFOV = 34.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.672 | | | | |
| 2 | Lens 1 | 1.826 | (ASP) | 0.977 | Plastic | 1.545 | 56.1 | 4.65 |
| 3 | | 5.308 | (ASP) | 0.282 | | | | |
| 4 | Lens 2 | −16.326 | (ASP) | 0.200 | Plastic | 1.679 | 18.4 | −6.45 |
| 5 | | 6.019 | (ASP) | 0.152 | | | | |
| 6 | Stop | Plano | | −0.074 | | | | |
| 7 | Lens 3 | 4.292 | (ASP) | 0.540 | Plastic | 1.582 | 30.2 | 7.21 |
| 8 | | −187.970 | (ASP) | 0.293 | | | | |
| 9 | Lens 4 | 205.339 | (ASP) | 0.257 | Plastic | 1.669 | 19.4 | 149.50 |
| 10 | | −194.932 | (ASP) | 0.531 | | | | |
| 11 | Lens 5 | ∞ | (ASP) | 0.280 | Plastic | 1.582 | 30.2 | ∞ |
| 12 | | ∞ | (ASP) | 0.446 | | | | |
| 13 | Lens 6 | −36.756 | (ASP) | 0.617 | Plastic | 1.679 | 18.4 | −45.71 |
| 14 | | 200.803 | (ASP) | 0.352 | | | | |
| 15 | Lens 7 | −3.227 | (ASP) | 0.552 | Plastic | 1.544 | 56.0 | −5.93 |
| 16 | | ∞ | (ASP) | 0.200 | | | | |
| 17 | Filter | Plano | | 0.210 | Glass | 1.517 | 64.2 | — |
| 18 | | Plano | | 0.366 | | | | |
| 19 | Image | Plano | | — | | | | |

Note:
Reference wavelength is 587.6 nm (d-line).
An effective radius of the stop 301 (Surface 6) is 1.110 mm.

TABLE 6

Aspheric Coefficients

| Surface # | 2 | 3 | 4 | 5 | 7 |
|---|---|---|---|---|---|
| k = | 2.7505E−01 | 5.8907E+00 | 8.9708E+01 | −4.9554E+01 | 2.5351E−01 |
| A4 = | −1.2300E−02 | −6.4528E−03 | −1.8772E−02 | −3.0504E−02 | −5.5211E−02 |
| A6 = | 2.2869E−02 | 3.1080E−02 | 4.7342E−02 | 1.0032E−01 | 2.7858E−02 |
| A8 = | −3.7015E−02 | −7.4526E−02 | −3.4733E−02 | −1.3186E−01 | 1.1638E−02 |
| A10 = | 2.7962E−02 | 1.0211E−01 | 1.5091E−02 | 1.7886E−01 | −3.7718E−02 |
| A12 = | −8.8047E−03 | −6.8259E−02 | −2.1122E−03 | −1.6350E−01 | 3.5850E−02 |
| A14 = | −2.2977E−04 | 1.9125E−02 | — | 8.7508E−02 | −1.2919E−02 |
| A16 = | 5.2244E−04 | — | — | −1.9881E−02 | 1.4377E−03 |

| Surface # | 8 | 9 | 10 | 11 | 12 |
|---|---|---|---|---|---|
| k = | 0.0000E+00 | 1.0000E+01 | −1.0000E+00 | 0.0000E+00 | 0.0000E+00 |
| A4 = | −2.4998E−02 | −4.5413E−02 | −4.7305E−02 | 1.1533E−02 | 3.4039E−02 |
| A6 = | −8.6058E−04 | −1.8718E−01 | −1.0133E−01 | −9.1570E−02 | −6.8377E−02 |
| A8 = | −2.1722E−02 | 3.9503E−01 | 1.6116E−01 | 5.2424E−02 | 3.5118E−02 |
| A10 = | 2.5441E−02 | −5.0054E−01 | −1.4592E−01 | −2.0590E−02 | −9.1416E−03 |
| A12 = | −1.6677E−02 | 3.4504E−01 | 7.1584E−02 | 4.5101E−03 | 1.3267E−03 |
| A14 = | 3.9941E−03 | −1.2271E−01 | −1.6348E−02 | −3.7672E−04 | −1.0174E−04 |
| A16 = | −6.9809E−05 | 1.7241E−02 | 1.3521E−03 | 2.6462E−06 | 3.1160E−06 |

| Surface # | 13 | 14 | 15 | 16 |
|---|---|---|---|---|
| k = | 2.2823E+01 | −9.0000E+01 | −1.1056E+00 | 0.0000E+00 |
| A4 = | −4.3586E−02 | −4.6543E−02 | −3.4668E−02 | −3.8940E−02 |
| A6 = | 3.5759E−03 | 7.6355E−03 | 1.5261E−02 | 1.4360E−02 |

TABLE 6-continued

| Aspheric Coefficients | | | | |
|---|---|---|---|---|
| A8 = | −1.4606E−03 | −2.0722E−03 | −1.6472E−03 | −3.4860E−03 |
| A10 = | 1.0337E−03 | 1.0110E−03 | −2.3009E−04 | 5.0696E−04 |
| A12 = | −2.3345E−04 | −3.4198E−04 | 8.8488E−05 | −4.3733E−05 |
| A14 = | 2.4450E−05 | 6.5049E−05 | −1.1295E−05 | 2.1083E−06 |
| A16 = | −1.2872E−06 | −6.7242E−06 | 7.4573E−07 | −5.5106E−08 |
| A18 = | 3.2201E−08 | 3.5339E−07 | −2.5392E−08 | 1.2148E−09 |
| A20 = | −3.0417E−10 | −7.3944E−09 | 3.5125E−10 | −2.9282E−11 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.96 | CT5/CT6 | 0.45 |
| Fno | 2.14 | CT5/T56 | 0.63 |
| HFOV [deg.] | 34.7 | T12/T67 | 0.80 |
| V2 | 18.4 | T67/CT6 | 0.57 |
| V3 | 30.2 | TL [mm] | 6.18 |
| V4 | 19.4 | TL/f | 1.04 |
| V5 | 30.2 | TL/ImgH | 1.49 |
| V6 | 18.4 | |R2/R1| | 2.91 |
| V2 + V4 + V6 | 56.2 | |R7|/TD | 37.99 |
| V1/N1 | 36.30 | |R14/R13| | ∞ |
| V2/N2 | 10.96 | |f/f1| | 1.28 |
| V3/N3 | 19.11 | f/f4 | 0.04 |
| V4/N4 | 11.65 | f/f5 | 0.00 |
| V5/N5 | 19.11 | f/f6 | −0.13 |
| V6/N6 | 10.96 | |f/f4| + |f/f5| + |f/f6| | 0.17 |
| V7/N7 | 36.26 | ImgH/BL | 5.36 |
| ΣCT/ΣAT | 1.73 | — | — |

4th Embodiment

Figure 7:
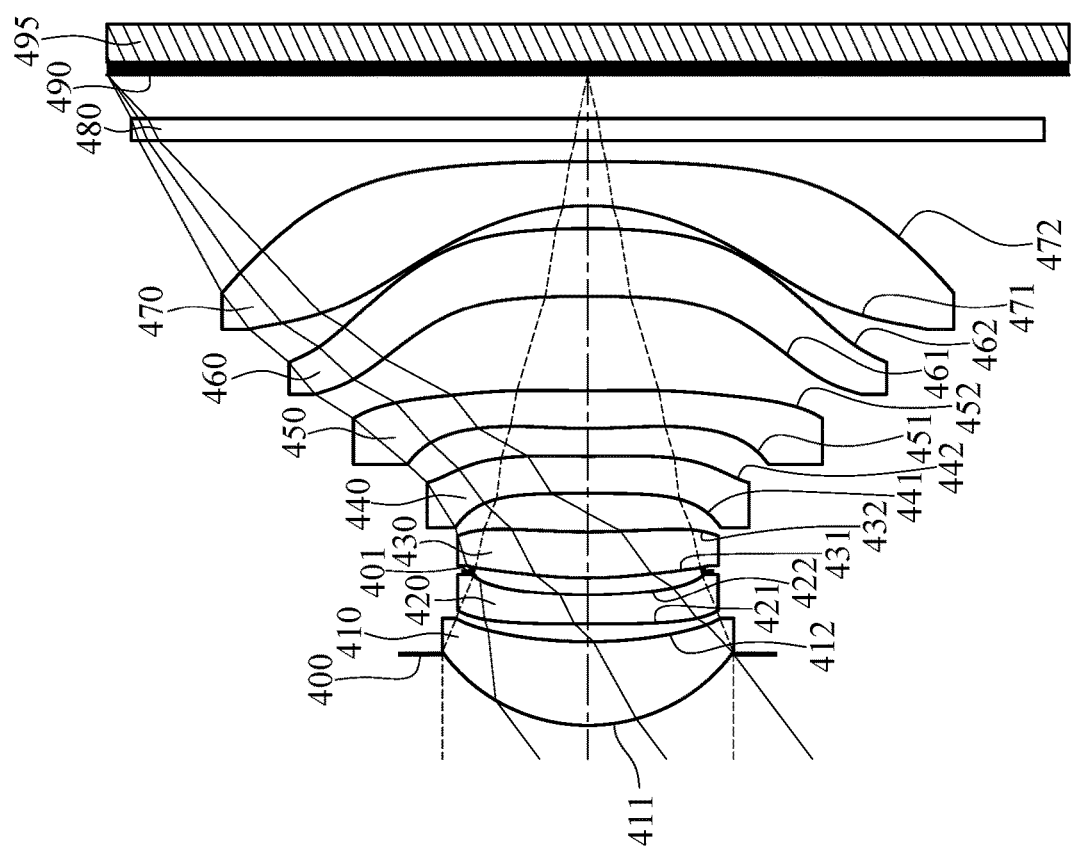
FIG. 7 is a schematic view of an image capturing unit according to the 4th embodiment of the present disclosure.
Figure 8:
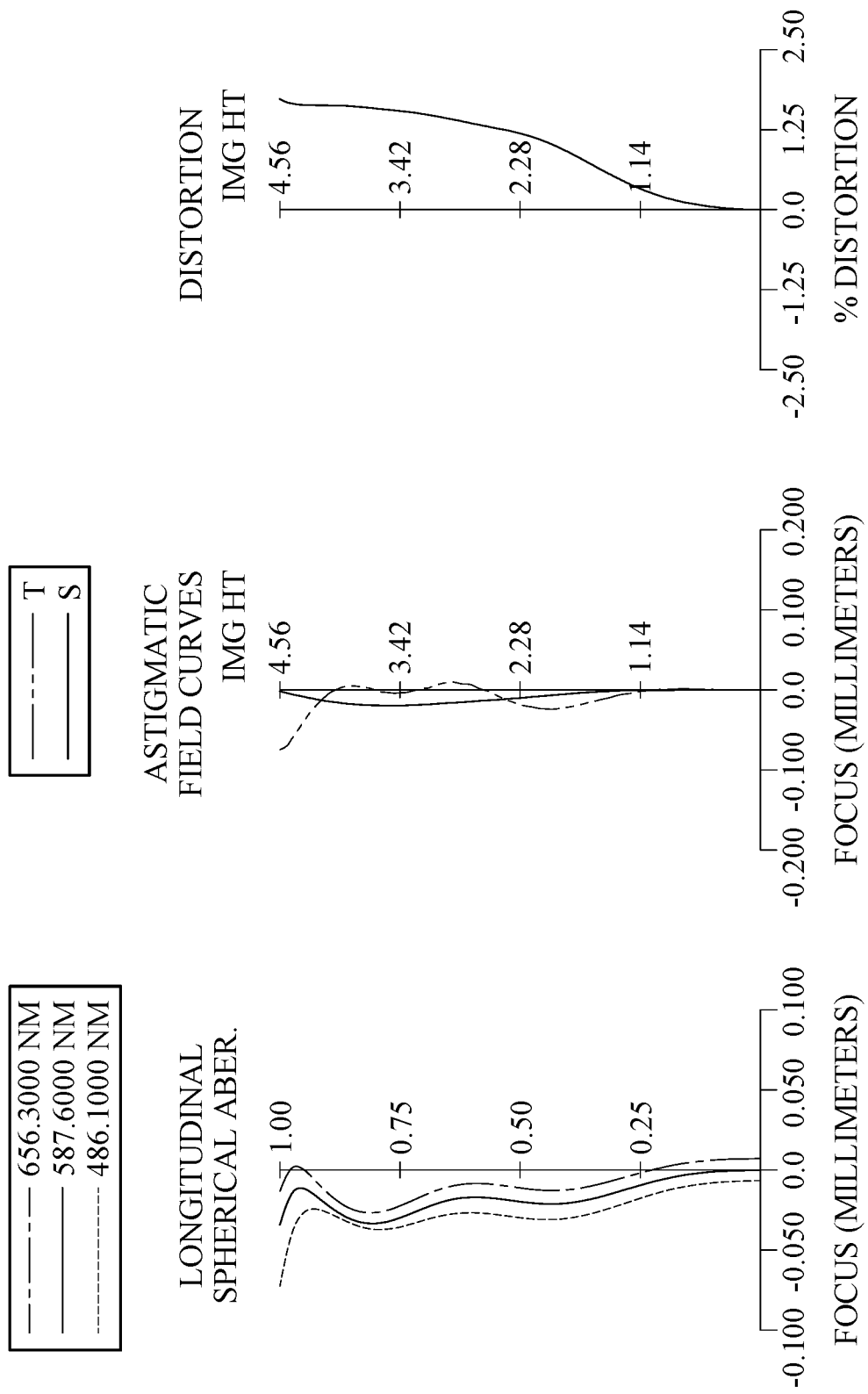
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 495. The optical imaging lens assembly includes, in order from an object side to an image side, an aperture stop 400, a first lens element 410, a second lens element 420, a stop 401, a third lens element 430, a fourth lens element 440, a fifth lens element 450, a sixth lens element 460, a seventh lens element 470, a filter 480 and an image surface 490. The optical imaging lens assembly includes seven lens elements (410, 420, 430, 440, 450, 460 and 470) with no additional lens element disposed between each of the adjacent seven lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has one inflection point in an off-axis region thereof.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric. The image-side surface 442 of the fourth lens element 440 has two inflection points in an off-axis region thereof.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has one inflection point in an off-axis region thereof. The image-side surface 452 of the fifth lens element 450 has one inflection point in an off-axis region thereof.

The sixth lens element 460 with positive refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has two inflection points in an off-axis region thereof. The image-side surface 462 of the sixth lens element 460 has two inflection points in an off-axis region thereof.

The seventh lens element 470 with negative refractive power has an object-side surface 471 being concave in a paraxial region thereof and an image-side surface 472 being convex in a paraxial region thereof. The seventh lens element 470 is made of plastic material and has the object-side surface 471 and the image-side surface 472 being both aspheric. The object-side surface 471 of the seventh lens element 470 has two inflection points in an off-axis region thereof.

The filter 480 is made of glass material and located between the seventh lens element 470 and the image surface 490, and will not affect the focal length of the optical imaging lens assembly. The image sensor 495 is disposed on or near the image surface 490 of the optical imaging lens assembly.

The detailed optical data of the 4th embodiment are shown in Table 7 and the aspheric surface data are shown in Table 8 below.

TABLE 7

4th Embodiment
f = 6.01 mm, Fno = 2.17, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.680 | | | | |
| 2 | Lens 1 | 1.738 | (ASP) | 0.797 | Plastic | 1.545 | 56.1 | 4.68 |
| 3 | | 4.576 | (ASP) | 0.168 | | | | |
| 4 | Lens 2 | 37.144 | (ASP) | 0.280 | Plastic | 1.669 | 19.4 | −11.27 |
| 5 | | 6.250 | (ASP) | 0.222 | | | | |
| 6 | Stop | Plano | | −0.061 | | | | |
| 7 | Lens 3 | 4.114 | (ASP) | 0.440 | Plastic | 1.544 | 56.0 | 17.64 |
| 8 | | 6.928 | (ASP) | 0.365 | | | | |
| 9 | Lens 4 | −121.900 | (ASP) | 0.350 | Plastic | 1.669 | 19.4 | −19.43 |
| 10 | | 14.573 | (ASP) | 0.267 | | | | |
| 11 | Lens 5 | 6.286 | (ASP) | 0.360 | Plastic | 1.544 | 56.0 | 14.49 |
| 12 | | 30.377 | (ASP) | 0.900 | | | | |
| 13 | Lens 6 | −14.828 | (ASP) | 0.644 | Plastic | 1.669 | 19.4 | 23.11 |
| 14 | | −7.701 | (ASP) | 0.216 | | | | |
| 15 | Lens 7 | −2.396 | (ASP) | 0.420 | Plastic | 1.534 | 55.9 | −4.56 |
| 16 | | −159.293 | (ASP) | 0.200 | | | | |
| 17 | Filter | Plano | | 0.210 | Glass | 1.517 | 64.2 | — |
| 18 | | Plano | | 0.412 | | | | |
| 19 | Image | Plano | | — | | | | |

Note:
Reference wavelength is 587.6 nm (d-line).
An effective radius of the stop 401 (Surface 6) is 1.100 mm.

TABLE 8

Aspheric Coefficients

| Surface # | 2 | 3 | 4 | 5 | 7 |
|---|---|---|---|---|---|
| k = | 2.0570E−01 | 6.1713E+00 | −9.0000E+01 | 7.8783E−01 | 0.0000E+00 |
| A4 = | −8.0745E−03 | −5.2494E−03 | 1.2842E−02 | −7.8017E−03 | −6.1471E−02 |
| A6 = | 1.4110E−02 | 1.4616E−02 | 4.7014E−02 | 1.0607E−01 | 4.2607E−02 |
| A8 = | −2.7860E−02 | −8.7352E−03 | −4.9218E−02 | −1.3202E−01 | −3.0532E−02 |
| A10 = | 2.7686E−02 | −5.8828E−03 | 2.5320E−02 | 1.2454E−01 | 1.4431E−02 |
| A12 = | −1.5869E−02 | 5.9538E−03 | −2.6404E−03 | −6.2999E−02 | −7.3116E−03 |
| A14 = | 4.6371E−03 | −4.0579E−04 | — | 1.9535E−02 | 7.5476E−03 |
| A16 = | −5.8363E−04 | — | — | −6.4261E−04 | −1.8854E−03 |

| Surface # | 8 | 9 | 10 | 11 | 12 |
|---|---|---|---|---|---|
| k = | 0.0000E+00 | −9.0000E+01 | −1.0000E+00 | −1.0000E+00 | −9.0000E+01 |
| A4 = | −6.2267E−02 | −1.0147E−01 | −1.1751E−01 | −9.4673E−02 | −3.4467E−02 |
| A6 = | 6.2188E−02 | 5.5487E−02 | 6.5978E−02 | 1.8219E−02 | −1.2442E−02 |
| A8 = | −1.2751E−01 | −8.2028E−02 | −3.9067E−02 | 1.0365E−02 | 2.3075E−02 |
| A10 = | 1.3280E−01 | 4.9103E−02 | 5.5690E−03 | −1.1303E−02 | −1.0447E−02 |
| A12 = | −8.5091E−02 | −2.2737E−02 | 3.1700E−03 | 3.9457E−03 | 2.1957E−03 |
| A14 = | 2.8257E−02 | 4.2393E−03 | −7.0298E−04 | −6.9982E−04 | −2.2146E−04 |
| A16 = | −3.4895E−03 | — | — | 4.8383E−05 | 8.4173E−06 |

| Surface # | 13 | 14 | 15 | 16 |
|---|---|---|---|---|
| k = | −1.0000E+00 | −2.0847E+01 | −9.4975E−01 | −7.8614E+01 |
| A4 = | −2.7939E−02 | −1.6578E−02 | −8.4415E−03 | −3.2370E−02 |
| A6 = | −2.1874E−02 | −2.1025E−02 | 9.3405E−03 | 1.8596E−02 |
| A8 = | 1.3568E−02 | 1.0483E−02 | −4.5718E−03 | −6.9037E−03 |
| A10 = | −4.5427E−03 | −2.4324E−03 | 1.4827E−03 | 1.4814E−03 |
| A12 = | 1.0714E−03 | 2.9325E−04 | −2.7245E−04 | −1.9694E−04 |
| A14 = | −1.6149E−04 | −1.2278E−05 | 2.9032E−05 | 1.6446E−05 |
| A16 = | 1.4298E−05 | −8.0755E−07 | −1.7931E−06 | −8.3552E−07 |

TABLE 8-continued

| Aspheric Coefficients | | | | |
|---|---|---|---|---|
| A18 = | −6.7518E−07 | 9.5412E−08 | 5.9585E−08 | 2.3474E−08 |
| A20 = | 1.3095E−08 | −2.5200E−09 | −8.2307E−10 | −2.7828E−10 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.01 | CT5/CT6 | 0.56 |
| Fno | 2.17 | CT5/T56 | 0.40 |
| HFOV [deg.] | 36.8 | T12/T67 | 0.78 |
| V2 | 19.4 | T67/CT6 | 0.34 |
| V3 | 56.0 | TL [mm] | 6.19 |
| V4 | 19.4 | TL/f | 1.03 |
| V5 | 56.0 | TL/ImgH | 1.36 |
| V6 | 19.4 | |R2/R1| | 2.63 |
| V2 + V4 + V6 | 58.3 | |R7|/TD | 22.71 |
| V1/N1 | 36.30 | |R14/R13| | 66.48 |
| V2/N2 | 11.65 | |f/f1| | 1.28 |
| V3/N3 | 36.26 | f/f4 | −0.31 |
| V4/N4 | 11.65 | f/f5 | 0.41 |
| V5/N5 | 36.26 | f/f6 | 0.26 |
| V6/N6 | 11.65 | |f/f4| + |f/f5| + |f/f6| | 0.98 |
| V7/N7 | 36.46 | ImgH/BL | 5.55 |
| ΣCT/ΣAT | 1.58 | — | — |

5th Embodiment

Figure 9:
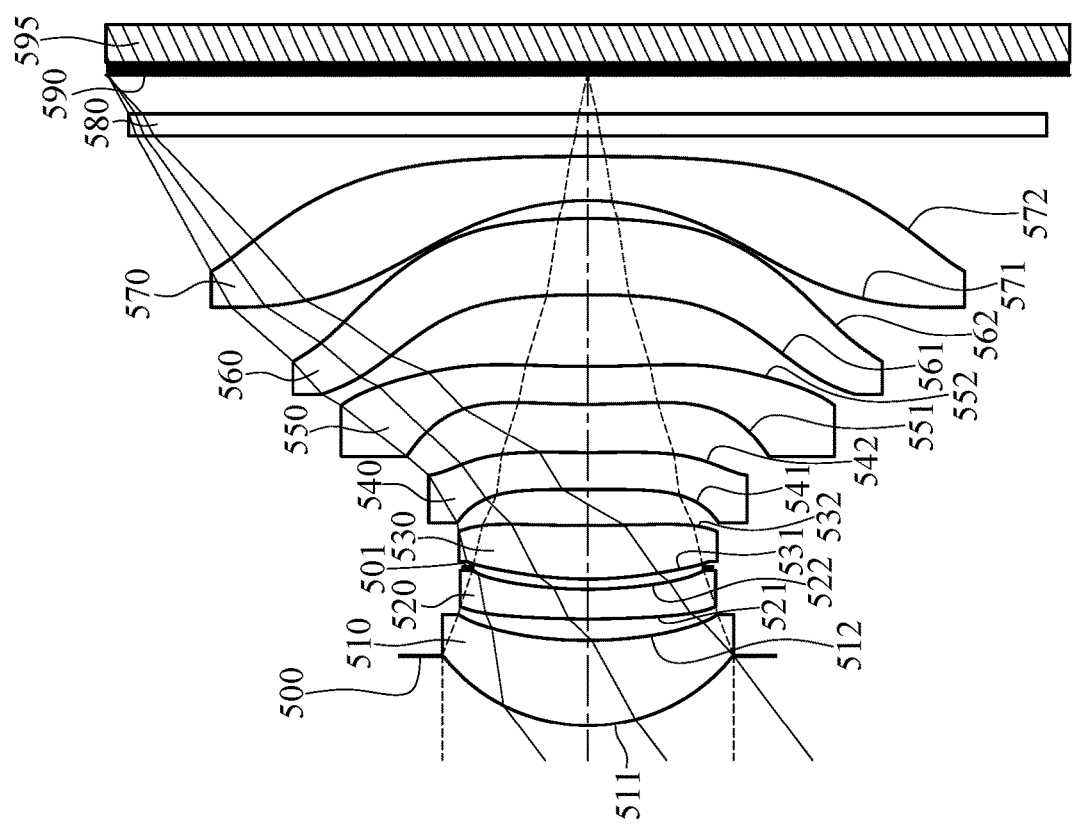
FIG. 9 is a schematic view of an image capturing unit according to the 5th embodiment of the present disclosure.
Figure 10:
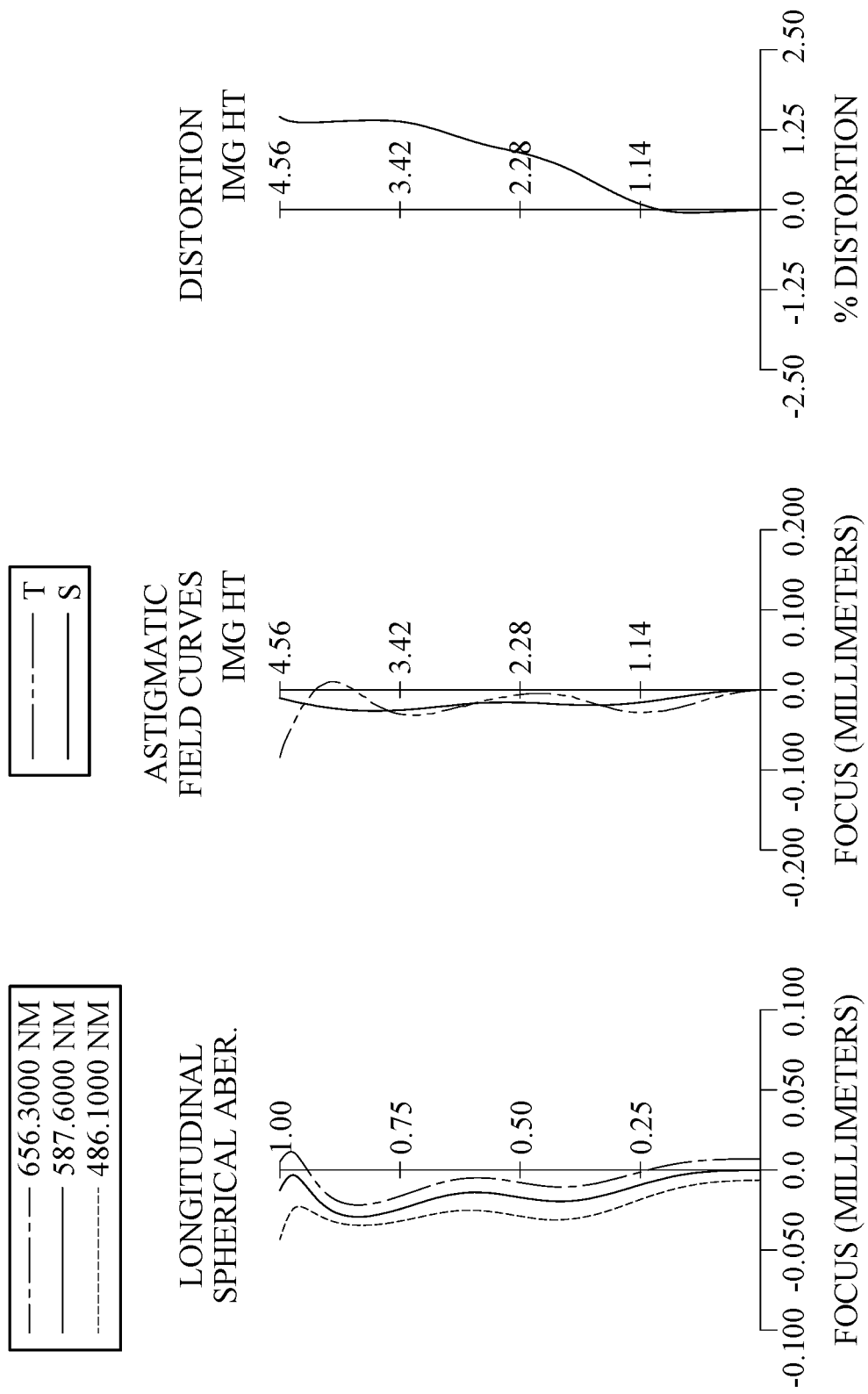
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 595. The optical imaging lens assembly includes, in order from an object side to an image side, an aperture stop 500, a first lens element 510, a second lens element 520, a stop 501, a third lens element 530, a fourth lens element 540, a fifth lens element 550, a sixth lens element 560, a seventh lens element 570, a filter 580 and an image surface 590. The optical imaging lens assembly includes seven lens elements (510, 520, 530, 540, 550, 560 and 570) with no additional lens element disposed between each of the adjacent seven lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has one inflection point in an off-axis region thereof.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has one inflection point in an off-axis region thereof. The image-side surface 542 of the fourth lens element 540 has two inflection points in an off-axis region thereof.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has one inflection point in an off-axis region thereof. The image-side surface 552 of the fifth lens element 550 has one inflection point in an off-axis region thereof.

The sixth lens element 560 with positive refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has two inflection points in an off-axis region thereof. The image-side surface 562 of the sixth lens element 560 has two inflection points in an off-axis region thereof.

The seventh lens element 570 with negative refractive power has an object-side surface 571 being concave in a paraxial region thereof and an image-side surface 572 being convex in a paraxial region thereof. The seventh lens element 570 is made of plastic material and has the object-side surface 571 and the image-side surface 572 being both aspheric. The object-side surface 571 of the seventh lens element 570 has one inflection point in an off-axis region thereof. The image-side surface 572 of the seventh lens element 570 has one inflection point in an off-axis region thereof.

The filter 580 is made of glass material and located between the seventh lens element 570 and the image surface 590, and will not affect the focal length of the optical imaging lens assembly. The image sensor 595 is disposed on or near the image surface 590 of the optical imaging lens assembly.

The detailed optical data of the 5th embodiment are shown in Table 9 and the aspheric surface data are shown in Table 10 below.

TABLE 9

5th Embodiment
f = 6.01 mm, Fno = 2.17, HFOV = 36.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.665 | | | | |
| 2 | Lens 1 | 1.771 | (ASP) | 0.812 | Plastic | 1.545 | 56.1 | 5.18 |
| 3 | | 3.981 | (ASP) | 0.205 | | | | |
| 4 | Lens 2 | 10.393 | (ASP) | 0.280 | Plastic | 1.669 | 19.4 | −9.64 |
| 5 | | 3.936 | (ASP) | 0.209 | | | | |
| 6 | Stop | Plano | | −0.113 | | | | |
| 7 | Lens 3 | 3.405 | (ASP) | 0.510 | Plastic | 1.544 | 56.0 | 8.70 |
| 8 | | 11.496 | (ASP) | 0.343 | | | | |
| 9 | Lens 4 | 68.754 | (ASP) | 0.350 | Plastic | 1.669 | 19.4 | −37.71 |
| 10 | | 18.420 | (ASP) | 0.465 | | | | |
| 11 | Lens 5 | 7.815 | (ASP) | 0.360 | Plastic | 1.544 | 56.0 | 42.87 |
| 12 | | 11.561 | (ASP) | 0.681 | | | | |
| 13 | Lens 6 | −8.489 | (ASP) | 0.723 | Plastic | 1.669 | 19.4 | 28.73 |
| 14 | | −6.090 | (ASP) | 0.171 | | | | |
| 15 | Lens 7 | −2.432 | (ASP) | 0.420 | Plastic | 1.534 | 55.9 | −4.75 |
| 16 | | −61.584 | (ASP) | 0.200 | | | | |
| 17 | Filter | Plano | | 0.210 | Glass | 1.517 | 64.2 | — |
| 18 | | Plano | | 0.368 | | | | |
| 19 | Image | Plano | | — | | | | |

Note:
Reference wavelength is 587.6 nm (d-line).
An effective radius of the stop 501 (Surface 6) is 1.100 mm.

TABLE 10

| Aspheric Coefficients | | | | | |
|---|---|---|---|---|---|
| Surface # | 2 | 3 | 4 | 5 | 7 |
| k = | 2.5320E−01 | 5.6663E+00 | −9.0000E+01 | −2.3734E+01 | 0.0000E+00 |
| A4 = | −1.4560E−02 | −5.9826E−03 | −9.7509E−03 | −3.0283E−02 | −7.2251E−02 |
| A6 = | 3.2113E−02 | 1.2143E−02 | 7.0567E−02 | 2.0907E−01 | 9.2527E−02 |
| A8 = | −6.3976E−02 | −2.5787E−03 | −9.0794E−02 | −4.2235E−01 | −6.9268E−02 |
| A10 = | 6.8327E−02 | −1.9615E−02 | 5.6994E−02 | 5.5560E−01 | −1.1955E−02 |
| A12 = | −4.2934E−02 | 1.7788E−02 | −1.1059E−02 | −4.5342E−01 | 5.4699E−02 |
| A14 = | 1.4422E−02 | −3.6045E−03 | — | 2.1948E−01 | −2.7092E−02 |
| A16 = | −2.0593E−03 | — | — | −4.5869E−02 | 3.9615E−03 |

| Surface # | 8 | 9 | 10 | 11 | 12 |
|---|---|---|---|---|---|
| k = | 0.0000E+00 | −7.3820E+01 | −1.0000E+00 | −1.0000E+00 | −8.1133E+01 |
| A4 = | −4.4353E−02 | −8.2670E−02 | −8.0883E−02 | −4.3281E−02 | −1.6512E−03 |
| A6 = | 2.5493E−02 | −1.0580E−01 | −2.3643E−02 | −4.4555E−02 | −4.4992E−02 |
| A8 = | −3.7875E−02 | 2.9202E−01 | 7.6328E−02 | 3.2134E−02 | 2.8672E−02 |
| A10 = | 2.0355E−02 | −4.3540E−01 | −8.4542E−02 | −1.1492E−02 | −8.5000E−03 |
| A12 = | −1.0329E−02 | 3.2812E−01 | 4.4940E−02 | 1.1520E−03 | 1.3472E−03 |
| A14 = | 2.8425E−03 | −1.2667E−01 | −1.0561E−02 | 2.0445E−04 | −1.0922E−04 |
| A16 = | −5.0783E−05 | 1.9338E−02 | 8.7654E−04 | −3.2618E−05 | 3.4468E−06 |

| Surface # | 13 | 14 | 15 | 16 |
|---|---|---|---|---|
| k = | −1.0000E+00 | −1.0966E+01 | −2.0419E+00 | 2.1091E+01 |
| A4 = | −2.6368E−02 | −8.0659E−03 | 1.0750E−02 | −2.4657E−02 |
| A6 = | −1.0061E−02 | −2.5012E−02 | −1.6984E−02 | 1.4653E−02 |
| A8 = | 3.0107E−03 | 1.1951E−02 | 8.0264E−03 | −5.9374E−03 |
| A10 = | −2.1342E−04 | −2.7436E−03 | −1.7909E−03 | 1.3648E−03 |
| A12 = | 1.0288E−04 | 3.1468E−04 | 2.3291E−04 | −1.9063E−04 |
| A14 = | −3.7438E−05 | −9.9919E−06 | −1.8747E−05 | 1.6581E−05 |
| A16 = | 5.2928E−06 | −1.2431E−06 | 9.2285E−07 | −8.8060E−07 |
| A18 = | −3.3500E−07 | 1.1710E−07 | −2.5461E−08 | 2.6265E−08 |
| A20 = | 7.9911E−09 | −2.8223E−09 | 3.0047E−10 | −3.3859E−10 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.01 | CT5/CT6 | 0.50 |
| Fno | 2.17 | CT5/T56 | 0.53 |
| HFOV [deg.] | 36.9 | T12/T67 | 1.20 |
| V2 | 19.4 | T67/CT6 | 0.24 |
| V3 | 56.0 | TL [mm] | 6.19 |
| V4 | 19.4 | TL/f | 1.03 |
| V5 | 56.0 | TL/ImgH | 1.36 |
| V6 | 19.4 | |R2/R1| | 2.25 |
| V2 + V4 + V6 | 58.3 | |R7|/TD | 12.69 |
| V1/N1 | 36.30 | |R14/R13| | 25.33 |
| V2/N2 | 11.65 | |f/f1| | 1.16 |
| V3/N3 | 36.26 | f/f4 | −0.16 |
| V4/N4 | 11.65 | f/f5 | 0.14 |
| V5/N5 | 36.26 | f/f6 | 0.21 |
| V6/N6 | 11.65 | |f/f4| + |f/f5| + |f/f6| | 0.51 |
| V7/N7 | 36.46 | ImgH/BL | 5.86 |
| ΣCT/ΣAT | 1.76 | — | — |

6th Embodiment

Figure 11:
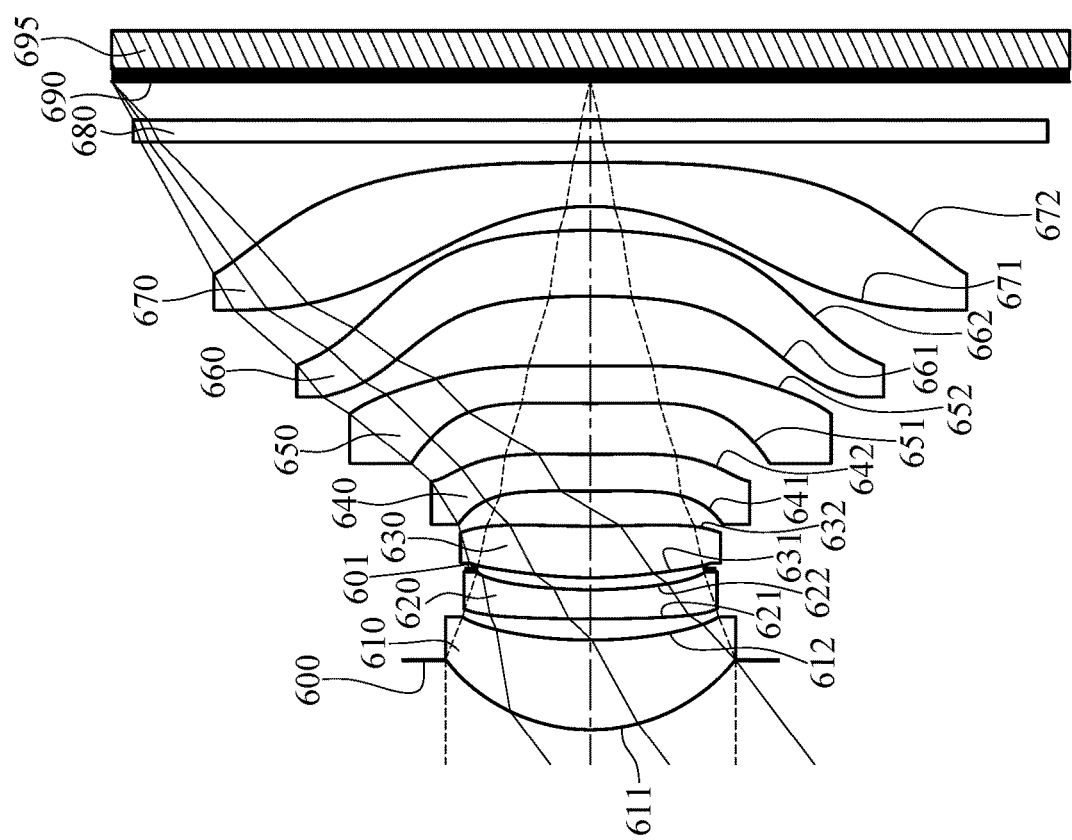
FIG. 11 is a schematic view of an image capturing unit according to the 6th embodiment of the present disclosure.
Figure 12:
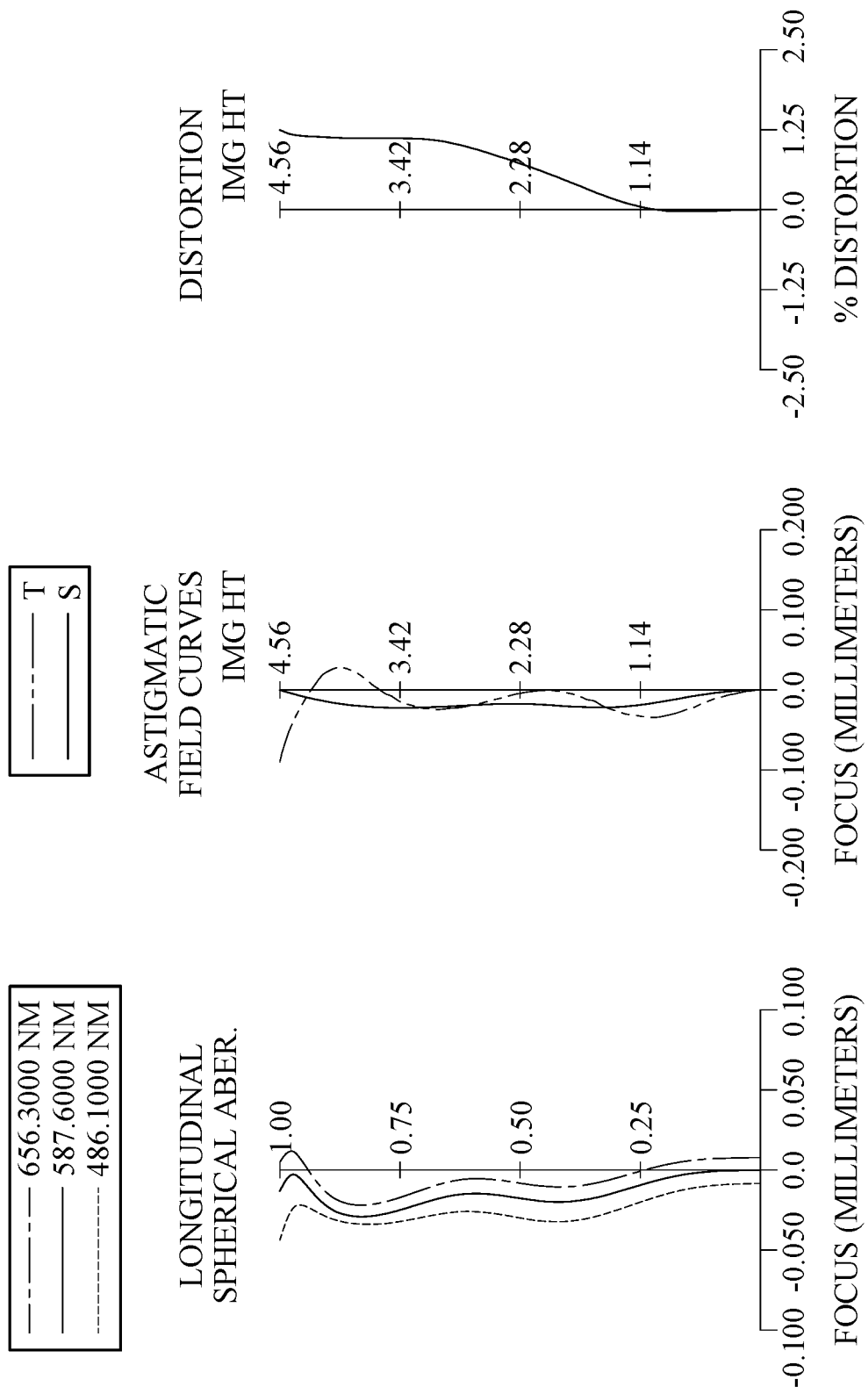
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 695. The optical imaging lens assembly includes, in order from an object side to an image side, an aperture stop 600, a first lens element 610, a second lens element 620, a stop 601, a third lens element 630, a fourth lens element 640, a fifth lens element 650, a sixth lens element 660, a seventh lens element 670, a filter 680 and an image surface 690. The optical imaging lens assembly includes seven lens elements (610, 620, 630, 640, 650, 660 and 670) with no additional lens element disposed between each of the adjacent seven lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has one inflection point in an off-axis region thereof.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has one inflection point in an off-axis region thereof. The image-side surface 642 of the fourth lens element 640 has two inflection points in an off-axis region thereof.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has one inflection point in an off-axis region thereof.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has two inflection points in an off-axis region thereof. The image-side surface 662 of the sixth lens element 660 has two inflection points in an off-axis region thereof.

The seventh lens element 670 with negative refractive power has an object-side surface 671 being concave in a paraxial region thereof and an image-side surface 672 being convex in a paraxial region thereof. The seventh lens element 670 is made of plastic material and has the object-side surface 671 and the image-side surface 672 being both aspheric. The object-side surface 671 of the seventh lens element 670 has one inflection point in an off-axis region thereof. The image-side surface 672 of the seventh lens element 670 has one inflection point in an off-axis region thereof.

The filter 680 is made of glass material and located between the seventh lens element 670 and the image surface 690, and will not affect the focal length of the optical imaging lens assembly. The image sensor 695 is disposed on or near the image surface 690 of the optical imaging lens assembly.

The detailed optical data of the 6th embodiment are shown in Table 11 and the aspheric surface data are shown in Table 12 below.

TABLE 11

6th Embodiment
f = 6.01 mm, Fno = 2.17, HFOV = 36.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.663 | | | | |
| 2 | Lens 1 | 1.783 | (ASP) | 0.855 | Plastic | 1.545 | 56.1 | 4.92 |
| 3 | | 4.419 | (ASP) | 0.201 | | | | |
| 4 | Lens 2 | 18.077 | (ASP) | 0.280 | Plastic | 1.669 | 19.4 | −9.18 |
| 5 | | 4.554 | (ASP) | 0.200 | | | | |
| 6 | Stop | Plano | | −0.086 | | | | |
| 7 | Lens 3 | 3.791 | (ASP) | 0.491 | Plastic | 1.544 | 56.0 | 10.22 |
| 8 | | 11.366 | (ASP) | 0.334 | | | | |
| 9 | Lens 4 | 24.336 | (ASP) | 0.350 | Plastic | 1.669 | 19.4 | −64.61 |
| 10 | | 15.480 | (ASP) | 0.491 | | | | |
| 11 | Lens 5 | 17.842 | (ASP) | 0.360 | Plastic | 1.544 | 56.0 | 31.75 |
| 12 | | −540.577 | (ASP) | 0.665 | | | | |
| 13 | Lens 6 | −7.368 | (ASP) | 0.628 | Plastic | 1.669 | 19.4 | 28.42 |
| 14 | | −5.492 | (ASP) | 0.226 | | | | |
| 15 | Lens 7 | −2.369 | (ASP) | 0.420 | Plastic | 1.534 | 55.9 | −4.50 |
| 16 | | −195.726 | (ASP) | 0.200 | | | | |
| 17 | Filter | Plano | | 0.210 | Glass | 1.517 | 64.2 | — |
| 18 | | Plano | | 0.368 | | | | |
| 19 | Image | Plano | | — | | | | |

Note:
Reference wavelength is 587.6 nm (d-line).
An effective radius of the stop 601 (Surface 6) is 1.100 mm.

TABLE 12

Aspheric Coefficients

| Surface # | 2 | 3 | 4 | 5 | 7 |
|---|---|---|---|---|---|
| k = | 2.6661E−01 | 6.7033E+00 | −6.4093E+01 | −2.3985E+01 | 0.0000E+00 |
| A4 = | −1.4485E−02 | −8.5515E−03 | −1.7048E−02 | −3.9683E−02 | −7.7236E−02 |
| A6 = | 3.0765E−02 | 1.7051E−02 | 7.7196E−02 | 2.1158E−01 | 7.6444E−02 |
| A8 = | −6.1227E−02 | −1.2695E−02 | −9.0768E−02 | −3.9762E−01 | −2.9681E−02 |
| A10 = | 6.4607E−02 | −4.3193E−03 | 5.5449E−02 | 5.2658E−01 | −5.5395E−02 |
| A12 = | −3.9617E−02 | 7.4692E−03 | −1.0609E−02 | −4.4316E−01 | 8.0424E−02 |
| A14 = | 1.2821E−02 | −7.1949E−04 | — | 2.2269E−01 | −3.4088E−02 |
| A16 = | −1.7325E−03 | — | — | −4.8072E−02 | 4.6415E−03 |

| Surface # | 8 | 9 | 10 | 11 | 12 |
|---|---|---|---|---|---|
| k = | 0.0000E+00 | 1.0000E+01 | −1.0000E+00 | −1.0000E+00 | −9.0000E+01 |
| A4 = | −5.1700E−02 | −8.5416E−02 | −8.2802E−02 | −2.8256E−02 | 6.7872E−03 |
| A6 = | 2.1093E−02 | −1.0352E−01 | −2.5245E−02 | −6.9990E−02 | −6.1790E−02 |
| A8 = | −2.3338E−02 | 2.7852E−01 | 6.9736E−02 | 5.5931E−02 | 4.1375E−02 |
| A10 = | 6.1051E−03 | −3.9990E−01 | −7.3054E−02 | −2.4048E−02 | −1.3054E−02 |
| A12 = | −2.1541E−03 | 2.8924E−01 | 3.5702E−02 | 4.6874E−03 | 2.1997E−03 |
| A14 = | 1.0299E−03 | −1.0695E−01 | −7.4772E−03 | −2.7132E−04 | −1.8916E−04 |
| A16 = | −1.8910E−05 | 1.5673E−02 | 5.3977E−04 | −8.8790E−06 | 6.3559E−06 |

| Surface # | 13 | 14 | 15 | 16 |
|---|---|---|---|---|
| k = | −1.0000E+00 | −9.4803E+00 | −2.2495E+00 | −5.5382E+01 |
| A4 = | −1.6746E−02 | −4.4240E−03 | 1.3011E−03 | −2.8102E−02 |
| A6 = | −1.3126E−02 | −2.1858E−02 | −9.9536E−03 | 1.2782E−02 |
| A8 = | −2.0153E−03 | 7.6534E−03 | 5.9780E−03 | −4.1977E−03 |
| A10 = | 3.3602E−03 | −1.1905E−03 | −1.4760E−03 | 8.6990E−04 |
| A12 = | −9.0162E−04 | 4.5729E−05 | 2.0528E−04 | −1.1749E−04 |
| A14 = | 1.1377E−04 | 1.7525E−05 | −1.7431E−05 | 1.0302E−05 |
| A16 = | −7.5626E−06 | −3.1648E−06 | 8.9875E−07 | −5.6464E−07 |
| A18 = | 2.4703E−07 | 2.0921E−07 | −2.5860E−08 | 1.7599E−08 |
| A20 = | −2.9086E−09 | −5.0004E−09 | 3.1743E−10 | −2.3828E−10 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.01 | CT5/CT6 | 0.57 |
| Fno | 2.17 | CT5/T56 | 0.54 |
| HFOV [deg.] | 36.9 | T12/T67 | 0.89 |
| V2 | 19.4 | T67/CT6 | 0.36 |
| V3 | 56.0 | TL [mm] | 6.19 |
| V4 | 19.4 | TL/f | 1.03 |
| V5 | 56.0 | TL/ImgH | 1.36 |
| V6 | 19.4 | |R2/R1| | 2.48 |
| V2 + V4 + V6 | 58.3 | |R7|/TD | 4.49 |
| V1/N1 | 36.30 | |R14/R13| | 82.62 |
| V2/N2 | 11.65 | |f/f1| | 1.22 |
| V3/N3 | 36.26 | f/f4 | −0.09 |
| V4/N4 | 11.65 | f/f5 | 0.19 |
| V5/N5 | 36.26 | f/f6 | 0.21 |
| V6/N6 | 11.65 | |f/f4| + |f/f5| + |f/f6| | 0.49 |
| V7/N7 | 36.46 | ImgH/BL | 5.86 |
| ΣCT/ΣAT | 1.67 | — | — |

7th Embodiment

Figure 13:
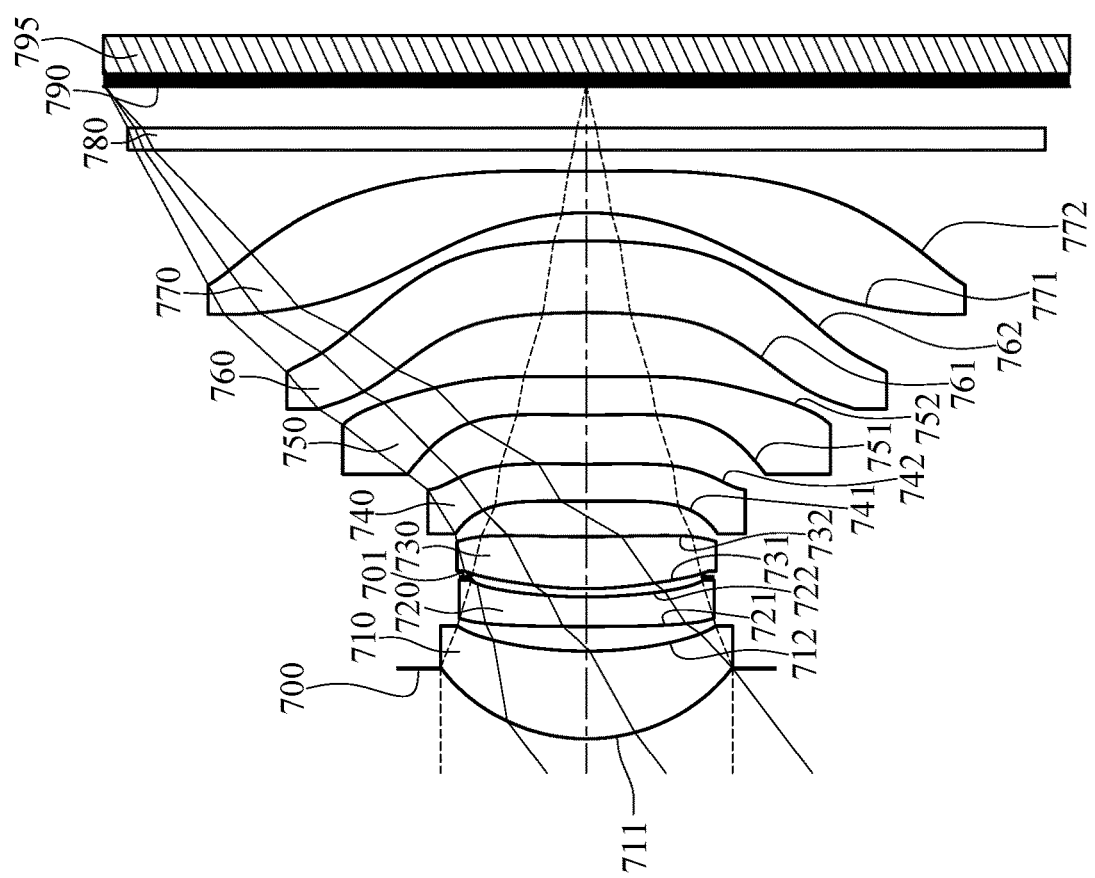
FIG. 13 is a schematic view of an image capturing unit according to the 7th embodiment of the present disclosure.
Figure 14:
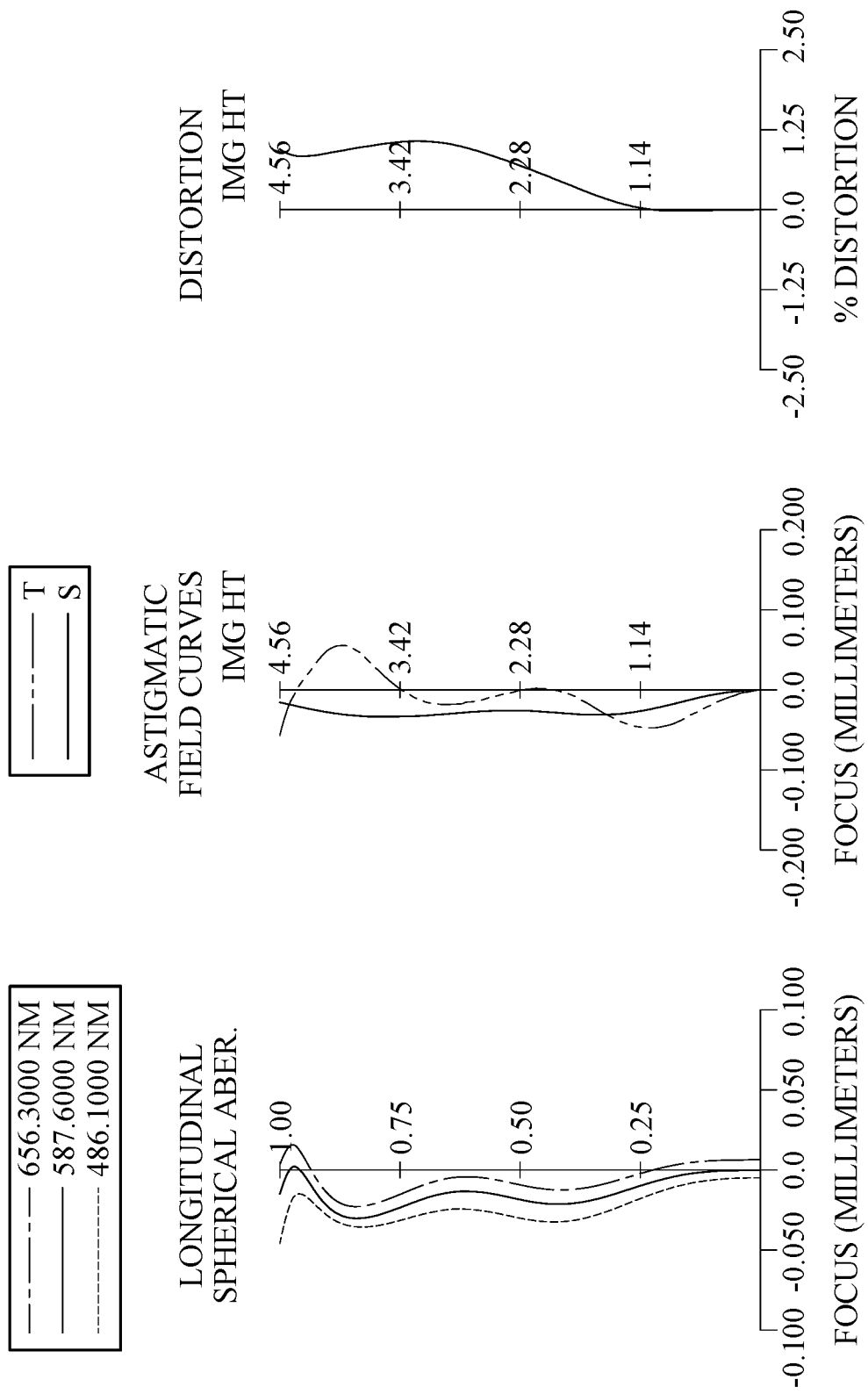
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 795. The optical imaging lens assembly includes, in order from an object side to an image side, an aperture stop 700, a first lens element 710, a second lens element 720, a stop 701, a third lens element 730, a fourth lens element 740, a fifth lens element 750, a sixth lens element 760, a seventh lens element 770, a filter 780 and an image surface 790. The optical imaging lens assembly includes seven lens elements (710, 720, 730, 740, 750, 760 and 770) with no additional lens element disposed between each of the adjacent seven lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The image-side surface 732 of the third lens element 730 has one inflection point in an off-axis region thereof.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has one inflection point in an off-axis region thereof. The image-side surface 742 of the fourth lens element 740 has two inflection points in an off-axis region thereof.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has one inflection point in an off-axis region thereof. The image-side surface 752 of the fifth lens element 750 has one inflection point in an off-axis region thereof.

The sixth lens element 760 with positive refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has two inflection points in an off-axis region thereof. The image-side surface 762 of the sixth lens element 760 has two inflection points in an off-axis region thereof.

The seventh lens element 770 with negative refractive power has an object-side surface 771 being concave in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has one inflection point in an off-axis region thereof. The image-side surface 772 of the seventh lens element 770 has two inflection points in an off-axis region thereof.

The filter 780 is made of glass material and located between the seventh lens element 770 and the image surface 790, and will not affect the focal length of the optical imaging lens assembly. The image sensor 795 is disposed on or near the image surface 790 of the optical imaging lens assembly.

The detailed optical data of the 7th embodiment are shown in Table 13 and the aspheric surface data are shown in Table 14 below.

TABLE 13

7th Embodiment
f = 6.01 mm, Fno = 2.17, HFOV = 37.0 deg.

| Surface # | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | −0.669 | | | | |
| 2 | Lens 1 | 1.777 | (ASP) | 0.831 | Plastic | 1.545 | 56.1 | 5.04 |
| 3 | | 4.208 | (ASP) | 0.232 | | | | |
| 4 | Lens 2 | 28.377 | (ASP) | 0.280 | Plastic | 1.669 | 19.4 | −8.76 |
| 5 | | 4.838 | (ASP) | 0.189 | | | | |
| 6 | Stop | Plano | | −0.111 | | | | |
| 7 | Lens 3 | 3.390 | (ASP) | 0.494 | Plastic | 1.544 | 56.0 | 8.66 |
| 8 | | 11.483 | (ASP) | 0.339 | | | | |
| 9 | Lens 4 | 27.836 | (ASP) | 0.350 | Plastic | 1.669 | 19.4 | −65.06 |
| 10 | | 16.893 | (ASP) | 0.471 | | | | |
| 11 | Lens 5 | 20.637 | (ASP) | 0.360 | Plastic | 1.544 | 56.0 | 61.86 |
| 12 | | 53.023 | (ASP) | 0.610 | | | | |
| 13 | Lens 6 | −8.103 | (ASP) | 0.681 | Plastic | 1.669 | 19.4 | 32.97 |
| 14 | | −6.126 | (ASP) | 0.265 | | | | |
| 15 | Lens 7 | −2.763 | (ASP) | 0.400 | Plastic | 1.534 | 55.9 | −4.76 |
| 16 | | 33.333 | (ASP) | 0.200 | | | | |
| 17 | Filter | Plano | | 0.210 | Glass | 1.517 | 64.2 | — |
| 18 | | Plano | | 0.393 | | | | |
| 19 | Image | Plano | | — | | | | |

Note:
Reference wavelength is 587.6 nm (d-line).
An effective radius of the stop 701 (Surface 6) is 1.110 mm.
An effective radius of the image-side surface 772 (Surface 16) is 3.590 mm.

TABLE 14

Aspheric Coefficients

| Surface # | 2 | 3 | 4 | 5 | 7 |
|---|---|---|---|---|---|
| k = | 2.5090E−01 | 6.4379E+00 | 8.9049E+01 | −3.0467E+01 | 0.0000E+00 |
| A4 = | −1.4633E−02 | −1.4670E−04 | 2.8555E−03 | −2.2302E−02 | −7.2778E−02 |
| A6 = | 3.2438E−02 | 3.8449E−03 | 3.4341E−02 | 1.5536E−01 | 6.6301E−02 |
| A8 = | −6.2657E−02 | −4.5835E−03 | −4.8109E−02 | −3.0238E−01 | 8.0808E−05 |
| A10 = | 6.4632E−02 | 3.5219E−04 | 3.1659E−02 | 3.9617E−01 | −1.0631E−01 |
| A12 = | −3.8711E−02 | −1.0747E−03 | −5.2954E−03 | −3.2853E−01 | 1.2604E−01 |
| A14 = | 1.2289E−02 | 2.1159E−03 | — | 1.6750E−01 | −5.2718E−02 |
| A16 = | −1.6310E−03 | — | — | −3.7378E−02 | 7.0722E−03 |

| Surface # | 8 | 9 | 10 | 11 | 12 |
|---|---|---|---|---|---|
| k = | 0.0000E+00 | −9.0000E+01 | −1.0000E+00 | −1.0000E+00 | −9.0000E+01 |
| A4 = | −4.4746E−02 | −7.1975E−02 | −7.7157E−02 | −3.5818E−02 | −3.3179E−03 |
| A6 = | 2.5119E−02 | −1.5729E−01 | −3.9702E−02 | −7.0755E−02 | −5.8680E−02 |
| A8 = | −3.5872E−02 | 4.1334E−01 | 9.0102E−02 | 6.2381E−02 | 4.3395E−02 |
| A10 = | 1.9300E−02 | −6.0188E−01 | −9.2233E−02 | −2.9665E−02 | −1.4610E−02 |
| A12 = | −8.5145E−03 | 4.5589E−01 | 4.5768E−02 | 6.8029E−03 | 2.6066E−03 |
| A14 = | 2.2072E−03 | −1.7742E−01 | −9.8740E−03 | −5.9656E−04 | −2.3657E−04 |
| A16 = | −3.9368E−05 | 2.7317E−02 | 7.3952E−04 | 7.3306E−06 | 8.3698E−06 |

| Surface # | 13 | 14 | 15 | 16 |
|---|---|---|---|---|
| k = | −1.0000E+00 | −1.5765E+01 | −1.7383E+00 | −6.3293E+00 |
| A4 = | −1.9650E−02 | −3.9277E−03 | −1.8315E−03 | −3.8826E−02 |
| A6 = | −1.4350E−02 | −2.5491E−02 | −1.0294E−02 | 1.5310E−02 |
| A8 = | −1.4162E−04 | 1.1483E−02 | 6.7290E−03 | −4.4602E−03 |
| A10 = | 2.8912E−03 | −3.1232E−03 | −1.7027E−03 | 8.8299E−04 |
| A12 = | −8.8910E−04 | 6.3025E−04 | 2.3953E−04 | −1.2046E−04 |
| A14 = | 1.2416E−04 | −8.9967E−05 | −2.0456E−05 | 1.1103E−05 |
| A16 = | −9.1655E−06 | 8.3295E−06 | 1.0573E−06 | −6.5616E−07 |
| A18 = | 3.3650E−07 | −4.3957E−07 | −3.0410E−08 | 2.2323E−08 |
| A20 = | −4.5755E−09 | 9.7925E−09 | 3.7216E−10 | −3.3005E−10 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.01 | CT5/CT6 | 0.53 |
| Fno | 2.17 | CT5/T56 | 0.59 |
| HFOV [deg.] | 37.0 | T12/T67 | 0.88 |
| V2 | 19.4 | T67/CT6 | 0.39 |
| V3 | 56.0 | TL [mm] | 6.19 |
| V4 | 19.4 | TL/f | 1.03 |
| V5 | 56.0 | TL/ImgH | 1.36 |
| V6 | 19.4 | |R2/R1| | 2.37 |
| V2 + V4 + V6 | 58.3 | |R7|/TD | 5.16 |
| V1/N1 | 36.30 | |R14/R13| | 12.06 |
| V2/N2 | 11.65 | |f/f1| | 1.19 |
| V3/N3 | 36.26 | f/f4 | −0.09 |
| V4/N4 | 11.65 | f/f5 | 0.10 |
| V5/N5 | 36.26 | f/f6 | 0.18 |
| V6/N6 | 11.65 | |f/f4| + |f/f5| + |f/f6| | 0.37 |
| V7/N7 | 36.46 | ImgH/BL | 5.68 |
| ΣCT/ΣAT | 1.70 | — | — |

8th Embodiment

Figure 15:
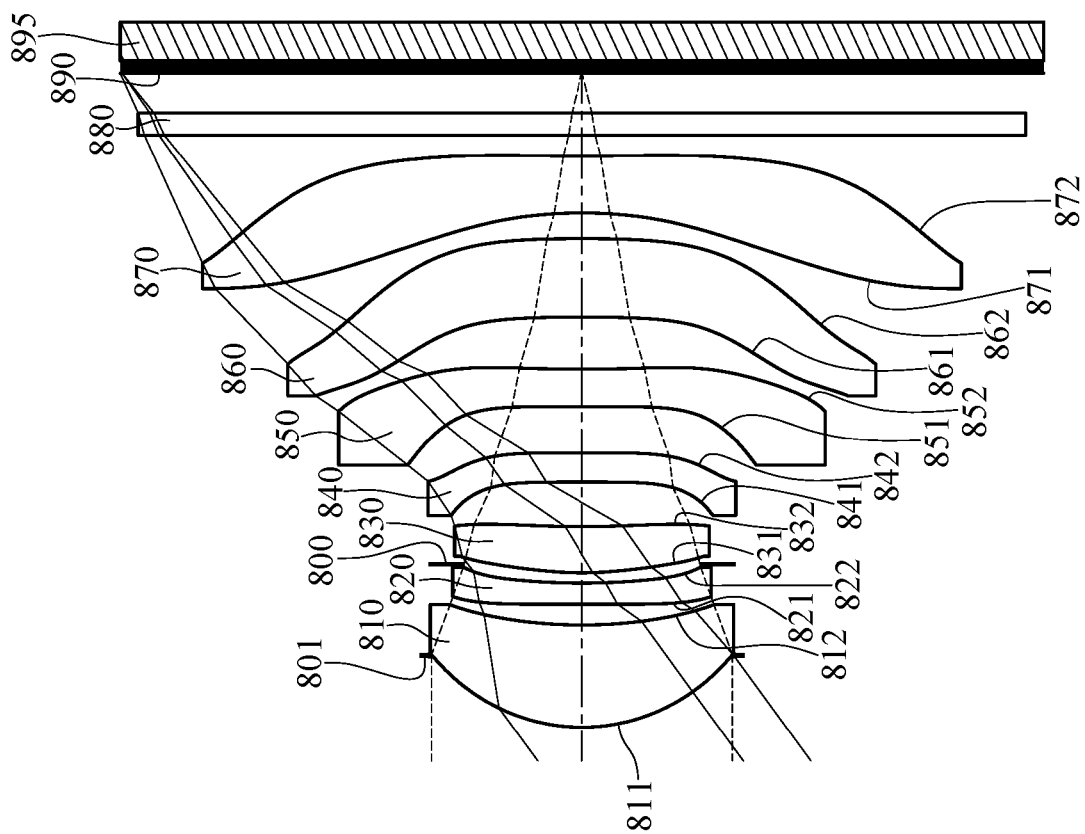
FIG. 15 is a schematic view of an image capturing unit according to the 8th embodiment of the present disclosure.
Figure 16:
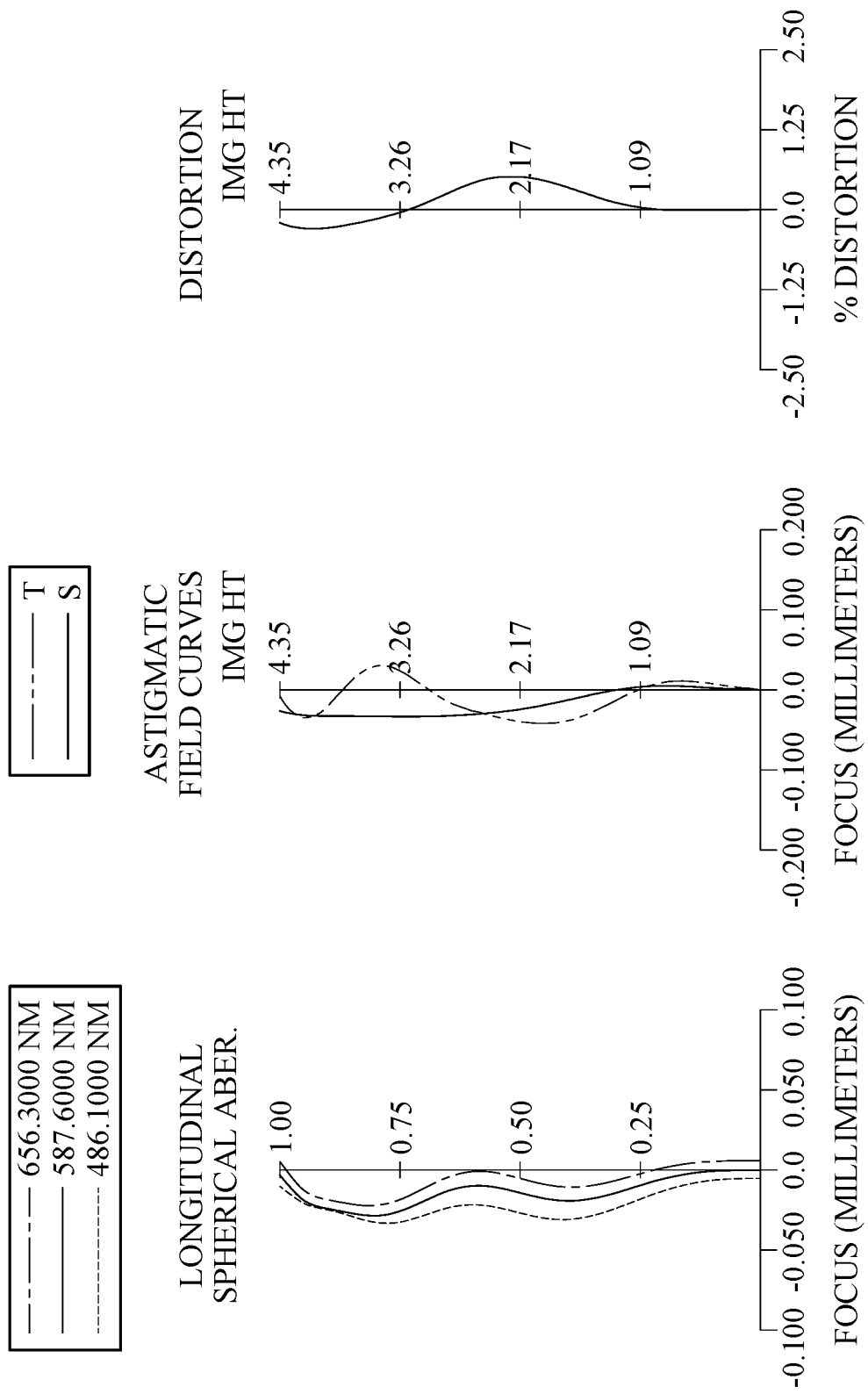
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 895. The optical imaging lens assembly includes, in order from an object side to an image side, a stop 801, a first lens element 810, a second lens element 820, an aperture stop 800, a third lens element 830, a fourth lens element 840, a fifth lens element 850, a sixth lens element 860, a seventh lens element 870, a filter 880 and an image surface 890. The optical imaging lens assembly includes seven lens elements (810, 820, 830, 840, 850, 860 and 870) with no additional lens element disposed between each of the adjacent seven lens elements.

The first lens element 810 with positive refractive power has an object-side surface 811 being convex in a paraxial region thereof and an image-side surface 812 being concave in a paraxial region thereof. The first lens element 810 is made of glass material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has one inflection point in an off-axis region thereof.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The image-side surface 832 of the third lens element 830 has one inflection point in an off-axis region thereof.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. The image-side surface 842 of the fourth lens element 840 has one inflection point in an off-axis region thereof.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has one inflection point in an off-axis region thereof. The image-side surface 852 of the fifth lens element 850 has one inflection point in an off-axis region thereof.

The sixth lens element 860 with positive refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has two inflection points in an off-axis region thereof. The image-side surface 862 of the sixth lens element 860 has two inflection points in an off-axis region thereof.

The seventh lens element 870 with negative refractive power has an object-side surface 871 being concave in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has one inflection point in an off-axis region thereof. The image-side surface 872 of the seventh lens element 870 has two inflection points in an off-axis region thereof.

The filter 880 is made of glass material and located between the seventh lens element 870 and the image surface 890, and will not affect the focal length of the optical imaging lens assembly. The image sensor 895 is disposed on or near the image surface 890 of the optical imaging lens assembly.

The detailed optical data of the 8th embodiment are shown in Table 15 and the aspheric surface data are shown in Table 16 below.

TABLE 15

8th Embodiment
f = 6.00 mm, Fno = 2.11, HFOV = 36.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.680 | | | | |
| 2 | Lens 1 | 1.795 | (ASP) | 0.968 | Glass | 1.542 | 62.9 | 4.79 |
| 3 | | 4.690 | (ASP) | 0.196 | | | | |
| 4 | Lens 2 | −165.886 | (ASP) | 0.200 | Plastic | 1.679 | 18.4 | −8.46 |
| 5 | | 5.954 | (ASP) | 0.180 | | | | |
| 6 | Ape. Stop | Plano | | −0.083 | | | | |
| 7 | Lens 3 | 3.224 | (ASP) | 0.436 | Plastic | 1.566 | 37.4 | 8.81 |
| 8 | | 8.670 | (ASP) | 0.422 | | | | |
| 9 | Lens 4 | −284.832 | (ASP) | 0.277 | Plastic | 1.669 | 19.4 | 607.21 |
| 10 | | −167.507 | (ASP) | 0.441 | | | | |
| 11 | Lens 5 | −200.000 | (ASP) | 0.354 | Plastic | 1.582 | 30.2 | −26.51 |
| 12 | | 16.741 | (ASP) | 0.492 | | | | |
| 13 | Lens 6 | −25.461 | (ASP) | 0.742 | Plastic | 1.639 | 23.2 | 71.07 |
| 14 | | −16.497 | (ASP) | 0.242 | | | | |
| 15 | Lens 7 | −4.729 | (ASP) | 0.540 | Plastic | 1.544 | 56.0 | −6.42 |
| 16 | | 13.906 | (ASP) | 0.200 | | | | |
| 17 | Filter | Plano | | 0.210 | Glass | 1.517 | 64.2 | — |
| 18 | | Plano | | 0.375 | | | | |
| 19 | Image | Plano | | — | | | | |

Note:
Reference wavelength is 587.6 nm (d-line).
An effective radius of the stop 801 (Surface 1) is 1.435 mm.
An effective radius of the image-side surface 872 (Surface 16) is 3.590 mm.

TABLE 16

Aspheric Coefficients

| Surface # | 2 | 3 | 4 | 5 | 7 |
|---|---|---|---|---|---|
| k = | 1.8815E−01 | 5.3776E+00 | −9.0000E+01 | −3.4402E+01 | −1.6925E+00 |
| A4 = | −7.8341E−03 | 2.9790E−03 | 4.4083E−03 | −4.1564E−02 | −9.3834E−02 |
| A6 = | 1.3141E−02 | −7.3495E−03 | 5.0270E−02 | 1.3408E−01 | 8.1001E−02 |
| A8 = | −3.2725E−02 | 1.7386E−02 | −5.7568E−02 | −1.2343E−01 | −5.8928E−03 |
| A10 = | 3.7919E−02 | −2.8627E−02 | 3.7526E−02 | 7.8395E−02 | −7.6968E−02 |
| A12 = | −2.5265E−02 | 2.0005E−02 | −8.4225E−03 | −2.6612E−02 | 9.0973E−02 |
| A14 = | 8.7345E−03 | −4.7095E−03 | — | 1.1274E−02 | −3.8967E−02 |
| A16 = | −1.2728E−03 | — | — | −4.0004E−03 | 5.3281E−03 |

| Surface # | 8 | 9 | 10 | 11 | 12 |
|---|---|---|---|---|---|
| k = | 2.7645E+01 | 1.0000E+01 | −3.9884E−11 | 9.0000E+01 | −5.6640E+00 |
| A4 = | −4.1022E−02 | −2.4887E−02 | −1.4788E−02 | 8.4458E−03 | 1.6629E−02 |
| A6 = | 7.1917E−03 | −2.6631E−01 | −1.7420E−01 | −9.4988E−02 | −5.6760E−02 |
| A8 = | −3.3637E−02 | 5.6740E−01 | 2.6171E−01 | 6.3465E−02 | 3.0922E−02 |
| A10 = | 5.9511E−02 | −7.6520E−01 | −2.4406E−01 | −3.0253E−02 | −8.6461E−03 |
| A12 = | −5.5136E−02 | 5.6884E−01 | 1.2597E−01 | 7.8916E−03 | 1.3738E−03 |
| A14 = | 2.4071E−02 | −2.1807E−01 | −3.0862E−02 | −8.4863E−04 | −1.1661E−04 |
| A16 = | −3.7700E−03 | 3.2977E−02 | 2.7698E−03 | 2.2127E−05 | 3.9089E−06 |

| Surface # | 13 | 14 | 15 | 16 |
|---|---|---|---|---|
| k = | 6.0682E+01 | 5.6452E+00 | −1.1845E+00 | −2.8734E+01 |
| A4 = | −4.7741E−02 | −4.3695E−02 | −3.5471E−02 | −4.3192E−02 |
| A6 = | 1.8098E−02 | 1.5761E−02 | 2.3628E−02 | 1.9108E−02 |
| A8 = | −2.5655E−02 | −1.3050E−02 | −7.3942E−03 | −5.2691E−03 |
| A10 = | 1.4735E−02 | 6.4825E−03 | 1.4340E−03 | 8.6045E−04 |
| A12 = | −4.0534E−03 | −1.8751E−03 | −1.7882E−04 | −8.7224E−05 |
| A14 = | 6.2053E−04 | 3.2815E−04 | 1.4333E−05 | 5.4368E−06 |
| A16 = | −5.4473E−05 | −3.3688E−05 | −7.1285E−07 | −1.9510E−07 |
| A18 = | 2.5579E−06 | 1.8463E−06 | 1.9988E−08 | 3.4541E−09 |
| A20 = | −4.9239E−08 | −4.1413E−08 | −2.4107E−10 | −1.9286E−11 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.00 | CT5/CT6 | 0.48 |
| Fno | 2.11 | CT5/T56 | 0.72 |
| HFOV [deg.] | 36.1 | T12/T67 | 0.81 |
| V2 | 18.4 | T67/CT6 | 0.33 |
| V3 | 37.4 | TL [mm] | 6.19 |
| V4 | 19.4 | TL/f | 1.03 |
| V5 | 30.2 | TL/ImgH | 1.42 |
| V6 | 23.2 | |R2/R1| | 2.61 |
| V2 + V4 + V6 | 61.1 | |R7|/TD | 52.68 |
| V1/N1 | 40.78 | |R14/R13| | 2.94 |
| V2/N2 | 10.96 | |f/f1| | 1.25 |
| V3/N3 | 23.91 | f/f4 | 0.01 |
| V4/N4 | 11.65 | f/f5 | −0.23 |
| V5/N5 | 19.11 | f/f6 | 0.08 |
| V6/N6 | 14.16 | |f/f4| + |f/f5| + |f/f6| | 0.32 |
| V7/N7 | 36.26 | ImgH/BL | 5.54 |
| ΣCT/ΣAT | 1.86 | — | — |

9th Embodiment

Figure 17:
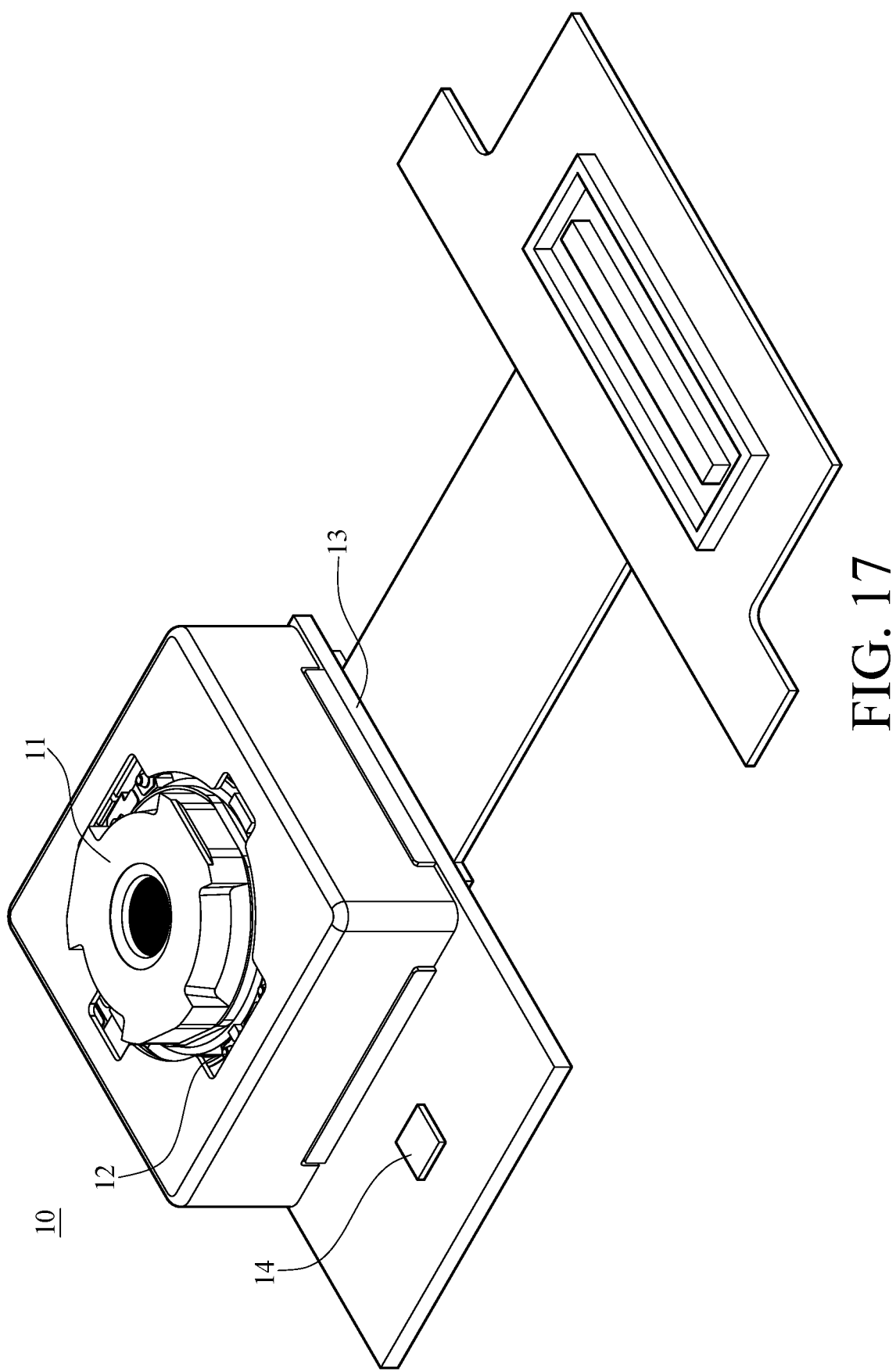
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 10 is a camera module including a lens unit 11, a driving device 12, an image sensor 13 and an image stabilizer 14. The lens unit 11 includes the optical imaging lens assembly disclosed in the 1st embodiment, a barrel and a holder member (their reference numerals are omitted) for holding the optical imaging lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

10th Embodiment

Figure 18:
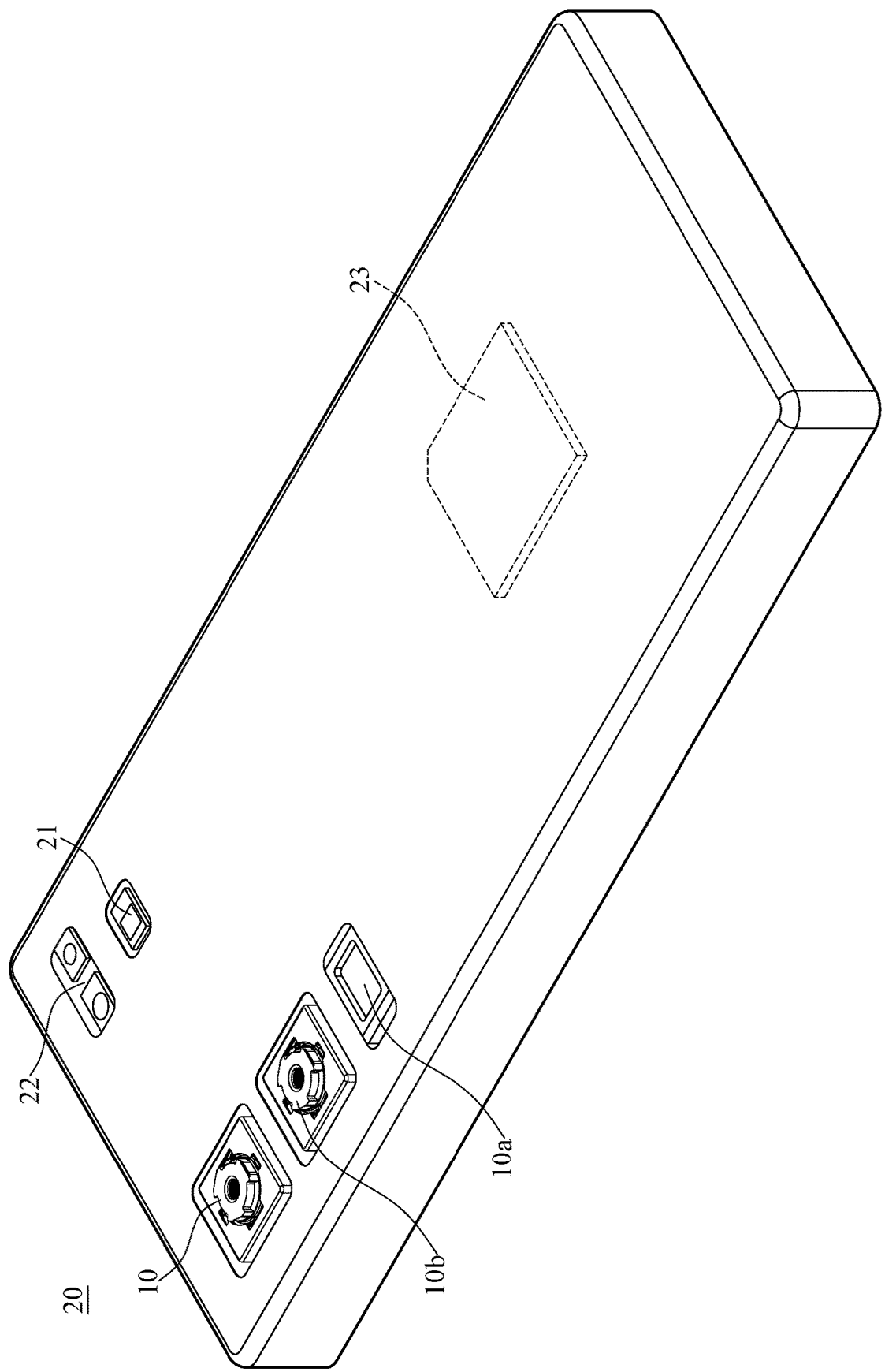
FIG. 18 is one perspective view of an electronic device according to the 10th embodiment of the present disclosure.
Figure 19:
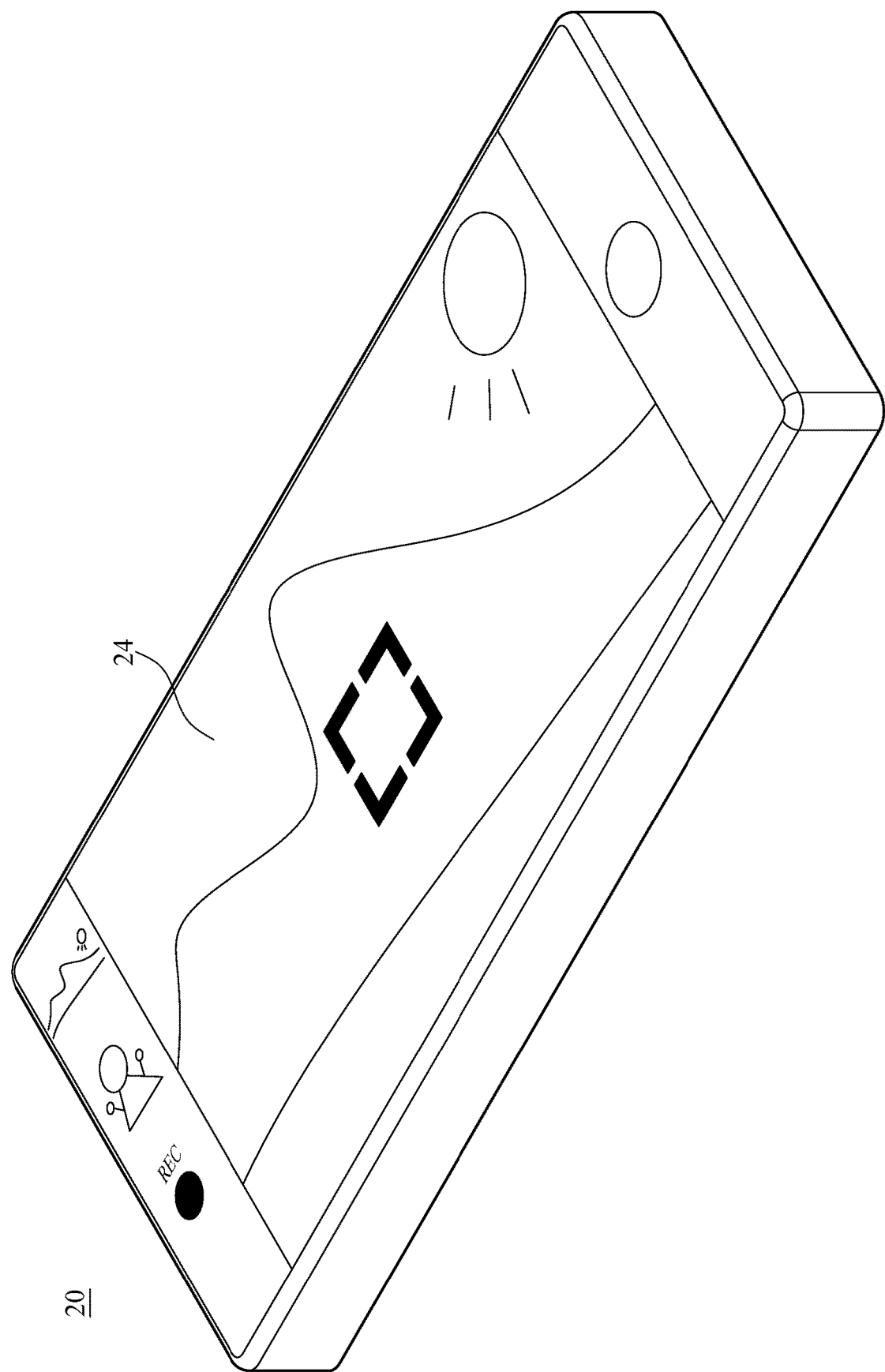
FIG. 19 is another perspective view of the electronic device in FIG. 18.
Figure 20:
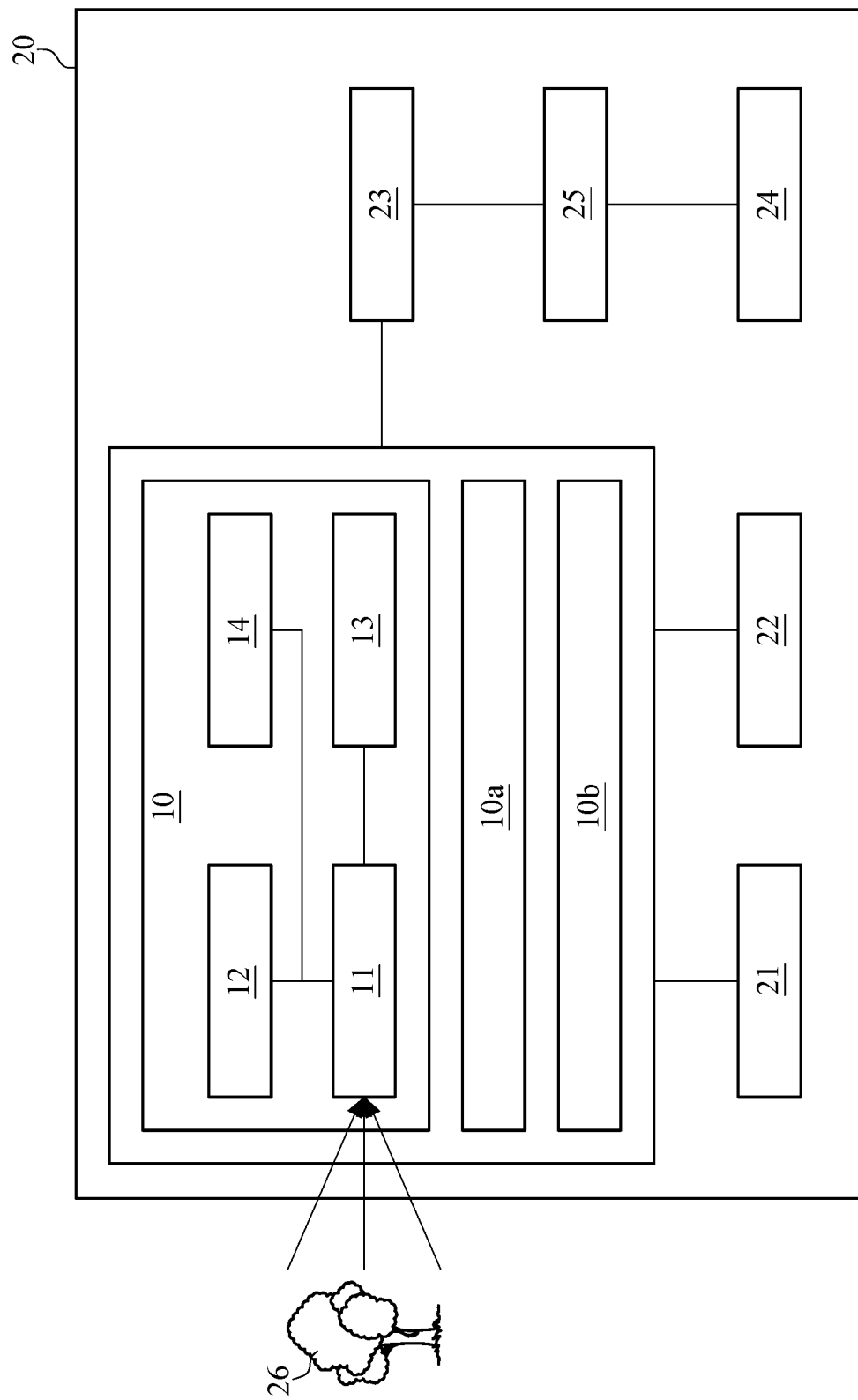
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18.

In this embodiment, an electronic device 20 is a smartphone including the image capturing unit 10 disclosed in the 9th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. Furthermore, the image capturing unit 10a and the image capturing unit 10b both have a configuration similar to that of the image capturing unit 10. In detail, each of the image capturing unit 10a and the image capturing unit 10b includes a lens unit, a driving device, an image sensor and an image stabilizer, and the lens unit includes a lens assembly, a barrel and a holder member for holding the lens assembly.

In this embodiment, the image capturing units 10, 10a and 10b have different fields of view (e.g., the image capturing unit 10 is a wide-angle image capturing unit, the image capturing unit 10a is a telephoto image capturing unit and the image capturing unit 10b is an ultra wide-angle image capturing unit), such that the electronic device 20 has various magnification ratios so as to meet the requirement of optical zoom functionality. In this embodiment, the electronic device 20 includes multiple image capturing units 10, 10a and 10b, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;
  wherein at least one lens element of the optical imaging lens assembly has at least one aspheric lens surface having at least one inflection point, and the object-side surface of the seventh lens element is concave in a paraxial region thereof;
  wherein an Abbe number of the sixth lens element is V6, a curvature radius of the object-side surface of the fourth lens element is R7, a curvature radius of the object-side surface of the seventh lens element is R13, a curvature radius of the image-side surface of the seventh lens element is R14, a focal length of the optical imaging lens assembly is f, a focal length of the fourth lens element is f4, a focal length of the fifth lens element is f5, a focal length of the sixth lens element is f6, an axial distance between the object-side surface of the first lens element and the image-side surface of the seventh lens element is TD, and the following conditions are satisfied:

$12.0<V6<34.0$;

$2.20<|R14/R13|$;

$|f/f4|+|f/f5|+|f/f6|<1.20$; and $2.80<|R7|/TD$.

2. The optical imaging lens assembly of claim 1, wherein the Abbe number of the sixth lens element is V6, and the following condition is satisfied:

$14.0<V6<25.0$.

3. The optical imaging lens assembly of claim 2, wherein an Abbe number of the fifth lens element is V5, the focal length of the optical imaging lens assembly is f, the focal length of the fifth lens element is f5, and the following conditions are satisfied:

$30.0<V5<60.0$; and $-0.33<f/f5<0.75$.

4. The optical imaging lens assembly of claim 1, wherein the seventh lens element has negative refractive power, at least one lens surface of the seventh lens element is aspheric and has at least one inflection point, the curvature radius of the object-side surface of the seventh lens element is R13, the curvature radius of the image-side surface of the seventh lens element is R14, and the following condition is satisfied:

$5.00<|R14/R13|$.

5. The optical imaging lens assembly of claim 1, wherein the focal length of the optical imaging lens assembly is f, the focal length of the fourth lens element is f4, the focal length of the fifth lens element is f5, the focal length of the sixth lens element is f6, and the following condition is satisfied:

$|f/f4|+|f/f5|+|f/f6|<1.00$.

6. The optical imaging lens assembly of claim 1, wherein the curvature radius of the object-side surface of the fourth lens element is R7, the axial distance between the object-side surface of the first lens element and the image-side surface of the seventh lens element is TD, and the following condition is satisfied:

$3.60<|R7|/TD$.

7. The optical imaging lens assembly of claim 1, wherein an axial distance between the object-side surface of the first lens element and an image surface is TL, the focal length of the optical imaging lens assembly is f, half of a maximum field of view of the optical imaging lens assembly is HFOV, and the following conditions are satisfied:

$2.0\ [mm]<TL<8.5\ [mm]$;

$0.70<TL/f<1.30$; and $32.5[\deg.]<HFOV<45.0[\deg.]$.

8. The optical imaging lens assembly of claim 1, wherein each of at least two lens elements of the optical imaging lens assembly has at least one aspheric lens surface having at least one inflection point, a sum of central thicknesses of all lens elements of the optical imaging lens assembly is ΣCT, a sum of axial distances between each of all adjacent lens elements of the optical imaging lens assembly is ΣAT, and the following condition is satisfied:

$1.50<\Sigma CT/\Sigma AT<2.30$.

9. The optical imaging lens assembly of claim 1, wherein the object-side surface and the image-side surface of at least one lens element of the optical imaging lens assembly are both aspheric, each of the object-side surface and the image-side surface of the at least one lens element has at least one inflection point, an axial distance between the first lens element and the second lens element is T12, an axial distance between the sixth lens element and the seventh lens element is T67, and the following condition is satisfied:

$0.35<T12/T67<2.45$.

10. The optical imaging lens assembly of claim 1, wherein the object-side surface of the first lens element is convex in a paraxial region thereof, a curvature radius of the object-side surface of the first lens element is R1, a curvature radius of the image-side surface of the first lens element is R2, and the following condition is satisfied:

$1.00<|R2/R1|<8.00$.

11. The optical imaging lens assembly of claim 1, wherein the second lens element has negative refractive power, the image-side surface of the second lens element is concave in a paraxial region thereof, the third lens element has positive refractive power, the object-side surface of the third lens element is convex in a paraxial region thereof, an Abbe number of the third lens element is V3, and the following condition is satisfied:

$$30.0 < V3 < 60.0.$$

12. An image capturing unit, comprising:
the optical imaging lens assembly of claim 1; and
an image sensor disposed on an image surface of the optical imaging lens assembly.

13. An electronic device, comprising:
the image capturing unit of claim 12.

* * * * *